(12) United States Patent
Ogura et al.

(10) Patent No.: US 7,558,177 B2
(45) Date of Patent: Jul. 7, 2009

(54) OPTICAL DISC PLAYBACK APPARATUS

(75) Inventors: Youichi Ogura, Ibaraki (JP); Shinichi Konishi, Nara (JP)

(73) Assignee: Panasonic Corporation, Osaka (JP)

( * ) Notice: Subject to any disclaimer, the term of this patent is extended or adjusted under 35 U.S.C. 154(b) by 705 days.

(21) Appl. No.: 11/344,184

(22) Filed: Feb. 1, 2006

(65) Prior Publication Data
US 2006/0239655 A1    Oct. 26, 2006

(30) Foreign Application Priority Data
Feb. 4, 2005    (JP)    ............... 2005-029768

(51) Int. Cl.
*G11B 7/00*    (2006.01)
(52) U.S. Cl. ............. 369/59.22; 369/47.17; 369/124.07
(58) Field of Classification Search ............... 369/47.17, 369/47.15, 124.07, 124.01, 47.18, 47.19, 369/47.25, 47.28, 59.21, 59.22
See application file for complete search history.

(56) References Cited

U.S. PATENT DOCUMENTS 6,834,035 B1 * 12/2004 Marukawa et al. ....... 369/59.22

FOREIGN PATENT DOCUMENTS

JP    2003-36612    2/2003

* cited by examiner

*Primary Examiner*—Nabil Z Hindi
(74) *Attorney, Agent, or Firm*—Wenderoth, Lind & Ponack, L.L.P.

(57) ABSTRACT

After a playback RF signal 3 detected from an optical disc medium 1 is waveform-shaped, it is converted into a digital RF signal 6 with a sampling clock 8 having a cycle twice as long as a channel clock. Thereafter, a first offset correction circuit 9 corrects an offset fluctuation in a high frequency band, and a digital adaptive equalizer 23 performs adaptive equalization, and then a second offset correction circuit 27 corrects an offset component that remains after the offset correction by the first offset correction circuit 9, thereby demodulating a digital binary signal 37. Therefore, even when high-speed playback is carried out and an asymmetry depending on the recording quality is large, a reduction in power consumption can be realized while maintaining high-performance playback. Consequently, it is possible to provide an optical disc playback apparatus which can realize sufficient playback performance at low power consumption.

7 Claims, 15 Drawing Sheets

○ : output signal of first offset correction circuit 9
● : output signal of second linear interpolation circuit 18
△ : phase error information 20
▲ : phase error information preprocessing signal (falling edge)

OPTICAL DISC PLAYBACK APPARATUS

FIELD OF THE INVENTION

The present invention relates to an optical disc playback apparatus for reproducing digital data from an optical recording medium. More specifically, the invention relates to a read channel technique for demodulating a digital binary signal from a playback RF signal.

BACKGROUND OF THE INVENTION

As a method for recording digital data on optical disk media, there has commonly been employed a method of uniformizing the recording density on a recording medium by making the linear velocity constant, as seen in a compact disk (hereinafter referred to as a CD), a DVD (Digital Versatile Disk), and a DVD-RAM (Digital Versatile Disk-Random Access Memory). When reproducing a digital binary signal from a playback RF (Radio Frequency) signal which is digitally recorded by performing mark width modulation so as to make the linear recording density constant, a digital read channel method employing a PRML (Partial Response Maximum Likelihood) signal processing technique has been known as a method for realizing high playback performance independently of recording quality of digital data and signal deterioration in reproduction path. When applying the PRML signal processing, it is necessary to detect a phase of a clock component corresponding to a channel bit frequency of the playback RF signal, from a signal in which an offset component in an amplitude direction is corrected, thereby to realize phase sync pull-in for synchronization of a sampling signal. When performing high-speed playback, in order to reduce power consumption by a digital circuit that operates at a high speed, there may be used a signal synchronized with a phase of a clock component corresponding to a frequency that is half of the channel bit frequency of the playback RF signal.

Hereinafter, a description will be given of a method for detecting a digital binary signal using a signal synchronized with a phase of a clock signal corresponding to a frequency that is half of the channel bit frequency of the playback RF signal.

With reference to FIG. 17, an optical disc playback signal that is reproduced from an optical recording medium 1 by a playback means 55 is input to a preamplifier 56 to emphasize an output amplitude thereof, and thereafter, the optical disc playback signal is subjected to correction that emphasizes a high-frequency band thereof by a waveform equalization means 57. The waveform equalization means 57 comprises a filter that can arbitrarily set a boost quantity and a cut-off frequency. The output of the waveform equalization means 57 is sampled to a multiple-bit digital RF signal 6 by an analog-to-digital (hereinafter referred to as "AD") converter 5 as a means for converting an analog signal into a digital signal, using a playback clock generated by a clock generation means 58. At this time, when codes of a digital binary signal 37 to be demodulated are those in which the minimum run length is restricted by 2, like 8-16 modulation codes used for a DVD, and MTF (Mutual Transfer Function) characteristics as optical playback characteristics are distributed within a frequency band that is shorter than about ¼ of the channel bit frequency, it is theoretically possible to demodulate the digital binary signal 37 in the case where the digital binary signal 37 is sampled by the AD converter 5 using a playback clock having a frequency component that is half of the channel bit frequency, according to the sampling theorem.

Then, the sampled multiple-bit digital RF signal 6 is input to a half rate processing offset control means 59 for half rate processing, thereby to correct an offset component in the amplitude direction, which is included in the digital RF signal 6 (refer to a description for FIG. 4 of "Disclosure of the Invention" in Japanese Published Patent Application No. 2003-36612: Patent Document 1).

On the other hand, in order to realize the PRML signal processing, it is necessary to generate, from the playback signal, a sampling signal that is synchronized with a phase of a frequency that is half of the frequency of a clock component included in the playback signal. For this purpose, in a half rate processing phase sync control means 60, a half rate processing phase error information detection means 61 detects phase error information from an output signal that is generated through the AD converter 5 and the half rate processing offset control means 59, using a signal in a normal sampling position and an interpolation signal that is obtained by restoring a signal that is missing in the time direction. Then, the clock generation means 58 performs control so that the phase of the playback clock is synchronized with the phase of a frequency that is equal to half of the clock component possessed by the playback RF signal 3, on the basis of an output signal of a loop filter 62 for smoothing the generated phase error information. Thereby, it is possible to generate, using the playback clock generated through the path from the AD converter 5 to the clock generation means 5, a multiple-bit digital RF signal 6 synchronized with the phase of a frequency that is equal to half of the clock component of the playback RF signal, thereby realizing PRML signal processing.

Next, the output signal of the half rate processing offset control means 59 is input to a half rate processing adaptive equalization means 63, and the signal is subjected partial response equalization. The partial response equalization employs a PR (a, b, b, a) system by which the waveform amplitude after the equalization is separated into five values as shown in FIG. 14(c). In FIGS. 14(b) and 14(c), white circles "○" indicate signals obtained by performing partial response equalization on the sampling signal synchronized with the phase of the frequency that is equal to half of the clock component of the playback RF signal 3, and black circles "●" indicate signals obtained by restoring signals that are missing in the time direction, using the interpolation filter 28 that can restore Nyquist band, which filter is possessed by the half rate processing adaptive equalization means 63.

As described above, since there are various types of PRML signal processing methods according to combinations of characteristics of playback waveform and modulation codes, it is necessary to select appropriate methods for the respective recording playback systems. The half rate processing adaptive equalization means 63 comprises, for example, a finite impulse response filter for performing partial response equalization, a filter coefficient learning circuit utilizing a LMS (least mean square) algorithm for performing adaptive control to minimize an equalization error that exists in the partial response equalization output signal outputted from the finite impulse response filter, and an interpolation filter 28 capable of restoring the Nyquist band for restoring signals missing in the time direction. The equalization characteristics by the finite impulse response filter is realized by varying the filter coefficients (refer to descriptions for FIGS. 6, 10, and 11 in "Disclosure of the Invention" of Patent Document 1).

Then, data demodulation is carried out by a half rate processing maximum likelihood decoder 64 which performs decoding according to the type of partial response, using a partial response equalization signal outputted by the above-mentioned sequence of operations. The half rate processing maximum likelihood decoder 64 is a Viterbi decoder which performs decoding using a frequency that is equal to half of the channel bit frequency. The Viterbi decoder performs probability calculation according to a rule of correlation of codes that are deliberately added according to the type of partial response, and estimates a most probable sequence. However, when the processing frequency is half of the channel bit frequency, adjacent two states in state transition must be regarded as one state. For example, when the half rate processing adaptive equalization means 63 outputs the signal in the normal sampling position and the interpolation signal restored by interpolation in parallel with each other, normal data in the normal sampling position and interpolation data are input to the adjacent two states, respectively, whereby parallel processing is carried out (refer to description for FIG. 12 in "Disclosure of the Invention" of Patent Document 1).

A significant reduction in power consumption can be achieved by performing the PRML signal processing method with a frequency that is equal to half of the channel bit frequency, using the characteristics of the 8-16 modulation coding or the like. Further, since it is possible to perform offset correction control and phase sync control by restoring signals that are missing in the time direction using a linear interpolation filter or a Nyquist interpolation filter, the playback performance can be maintained.

In the conventional construction, however, when an asymmetry, i.e., an up-to-down asymmetric distortion which occurs dependently of the quality of the recorded digital data in the playback RF signal, is large, a calculation error due to the asymmetry occurs in the method of correcting an offset component in the amplitude direction by restoring data missing in the time direction by linear interpolation, thereby degrading offset correction accuracy. Thereby, the offset component remains in the PRML signal processing, and the demodulation performance of the digital binary signal is degraded. Further, in the case where the offset correction accuracy is improved by data interpolation using the Nyquist filter when the offset component is corrected, since the Nyquist interpolation processing causes an increase in the length of the feedback control loop, the control performance is degraded when high-speed feedback control is required against defects or rapid offset fluctuations. Likewise, also the partial response equalization performance is degraded because a source signal of filter coefficient learning becomes to have an offset component.

On the other hand, when employing not the PRML signal processing but a level determination method which performs binary determination at an arbitrary level, and when jitter indicating the signal quality in the playback system should be accurately detected, it is desired to perform sampling with a phase that is 180° shifted from the above-mentioned sampling phase. However, when asymmetry is large, detection of a digital binary signal and detection of jitter cannot be accurately carried out.

SUMMARY OF THE INVENTION

The present invention is made to solve the above-described problems and has for its object to provide an optical disc playback apparatus which can realize sufficient playback performance at low power consumption, even when high-speed playback is carried out and an asymmetry depending on the recording quality is large.

In order to solve the above-mentioned problems, there is provided an optical disc playback apparatus for demodulating digital data from an optical recording medium on which digital data are recorded using recording codes having a restriction that at least three same codes should be continued, and this apparatus comprises: a playback signal detection circuit for detecting a playback RF signal from the optical recording medium; a playback RF signal adjustment circuit for adjusting an amplitude of the playback RF signal, and improving jitters; a clock generation circuit for generating a sampling clock that is synchronized with a period twice as long as a clock component included in the playback RF signal; an AD converter for generating a digital RF signal by sampling an output signal of the playback RF signal adjustment circuit with the sampling clock; a first offset correction circuit for correcting an offset component in an amplitude direction in the digital RF signal; a phase sync control circuit for extracting phase error information from an output signal of the first offset correction circuit, and performing phase sync control of the sampling clock generated by the clock generation circuit, so as to bring the phase error information close to zero; a digital adaptive equalizer for adaptively equalizing the output signal of the first offset correction circuit; a second offset correction circuit for correcting an offset component in the amplitude direction which occurs in an output signal of the digital adaptive equalizer due to influence of the offset component that cannot be corrected by the first offset correction circuit; an interpolation filter for receiving the output signal of the digital adaptive equalizer as an input signal, and generating a first demodulation preprocessing signal by delaying the input signal by a predetermined period of time, and a second demodulation preprocessing signal which is a signal missing in the time direction of the input signal; the second offset correction circuit extracting offset information in the amplitude direction from the first demodulation preprocessing signal and the second demodulation preprocessing signal to correct the offset component in the amplitude direction of the output signal from the digital adaptive equalizer; a jitter detection circuit for extracting jitter information from the first demodulation preprocessing signal and the second demodulation preprocessing signal; and a data demodulation circuit for demodulating the first demodulation preprocessing signal and the second demodulation preprocessing signal to obtain a digital binary signal.

Further, in the optical disc playback apparatus, the first offset correction circuit is provided with a first linear interpolation filter for restoring a signal that is missing in the time direction due to conversion of the digital RF signal with a channel bit, by obtaining an average of two digital RF signals which are timewise adjacent to each other; and the first offset correction circuit extracts an offset component in the amplitude direction of the digital RF signal from the digital RF signal and an output signal of the first linear interpolation filter, and corrects the offset component in the amplitude direction of the digital RF signal.

Further, in the optical disc playback apparatus, the phase sync control circuit is provided with a second linear interpolation filter for restoring a signal that is missing in the time direction due to conversion of the digital RF signal with a channel bit, by obtaining an average of two output signals from the first offset correction circuit, which are timewise adjacent to each other; and the phase sync control circuit extracts phase error information from an output signal of the first offset correction circuit and an output signal of the second linear interpolation filter, and performs phase sync control of the sampling clock generated by the clock generation circuit, so as to bring the phase error information close to zero.

Further, in the optical disc playback apparatus, the interpolation filter comprises a finite impulse response filter having a minimum number of taps required for maintaining accuracy, and restores a Nyquist band.

Further, in the optical disc playback apparatus, the first offset correction circuit is provided with a first control gain adjustment circuit for adjusting the control speed; the second offset correction circuit is provided with a second control gain adjustment circuit for adjusting the control speed; the first control gain adjustment circuit sets a control gain for high-speed control; and the second control gain adjustment circuit sets a control gain for low-speed control.

Further, the optical disc playback apparatus further includes a sampling phase switching flag generation circuit for generating a sampling phase switching flag which changes a sampling phase of the AD converter by selecting either 0° or 180° for a phase of a channel bit frequency; and the phase sync control circuit changes a method for detecting the phase error information, according to the sampling phase switching flag; the first offset correction circuit and the second offset correction circuit change a method for extracting an offset component in the amplitude direction, according to the sampling phase switching flag; the digital adaptive equalizer performs adaptive equalization on the basis of a partial response method; and the data demodulation circuit further includes a maximum likelihood decoding circuit that performs calculation of probability according to the partial response method, and changes a demodulation method according to the sampling phase switching flag.

Further, in the optical disc playback apparatus, the digital adaptive equalizer comprises a finite impulse response filter, and is provided with a filter coefficient learning circuit for learning weighting factors of taps of the filter so that a root-mean-square error of the first demodulation preprocessing signal and the second demodulation preprocessing signal from a target level of the partial response system approaches zero.

EFFECTS OF THE INVENTION

The optical disc playback apparatus according to the present invention is provided with the first offset correction circuit for performing phase sync control corresponding to high-speed control based on the premise of linear interpolation, and the second offset correction circuit for performing offset correction with high accuracy based on the premise of Nyquist interpolation. Thereby, the first offset correction and the phase sync control can be carried out in response to each other, against defects or rapid offset fluctuations. Further, in both of the level determination method and the PRML signal processing method, offset components in the amplitude direction of signals used for the respective methods can be accurately reduced by the second offset correction. Therefore, sufficient playback performance can be realized even when an asymmetry, which exists in the playback RF signal depending on the recording quality of recorded digital data, is large.

Furthermore, in the optical disc playback apparatus according to the present invention, since detection of jitter which serves as an indicator of the playback signal quality can be carried out with high accuracy, it is possible to accurately perform adjustment of the cutoff frequency and boost learning of an analog equalizer to improve the jitter of the playback RF signal, and adjustment of the best point for balance learning in focus servo relating to the performance of the playback RF signal, resulting in significant increase in the playback signal quality even during high-speed playback.

DETAILED DESCRIPTION OF THE PREFERRED EMBODIMENTS

Hereinafter, embodiments of optical disc playback apparatuses according to the present invention will be described in detail with reference to the drawings.

Embodiment 1

Figure 1:
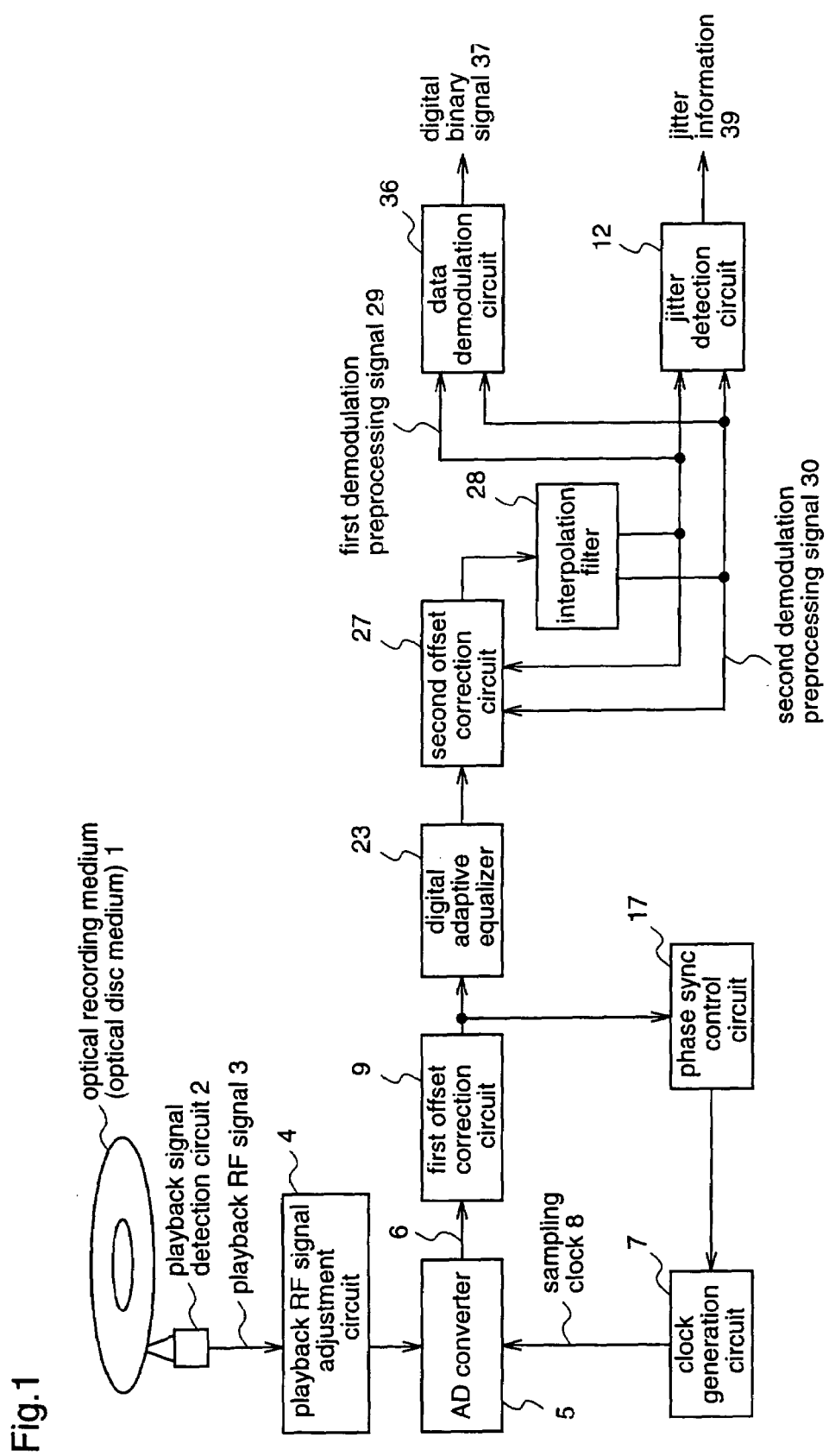
FIG. 1 is a block diagram illustrating the construction of an optical disc playback apparatus according to a first embodiment of the present invention.

FIG. 1 is a block diagram illustrating the construction of an optical disc playback apparatus according to a first embodiment of the present invention.

This first embodiment corresponds to claims 1 to 5 of the present invention. When digitizing a playback RF signal reproduced from an optical disc medium to demodulate a digital binary signal, the playback RF signal is converted into a digital signal synchronized with a sampling clock having a cycle twice as long as a channel bit cycle, and thereafter, phase sync control, adaptive equalization, jitter detection and the like are effectively functioned by employing a first offset correction circuit adaptable to high-speed control and a second offset correction circuit adaptable to low-speed control and sensitive to offset correction accuracy, whereby low power consumption is realized, and high-performance playback can be realized even when an asymmetry existing in the playback RF signal is large.

Figure 2:
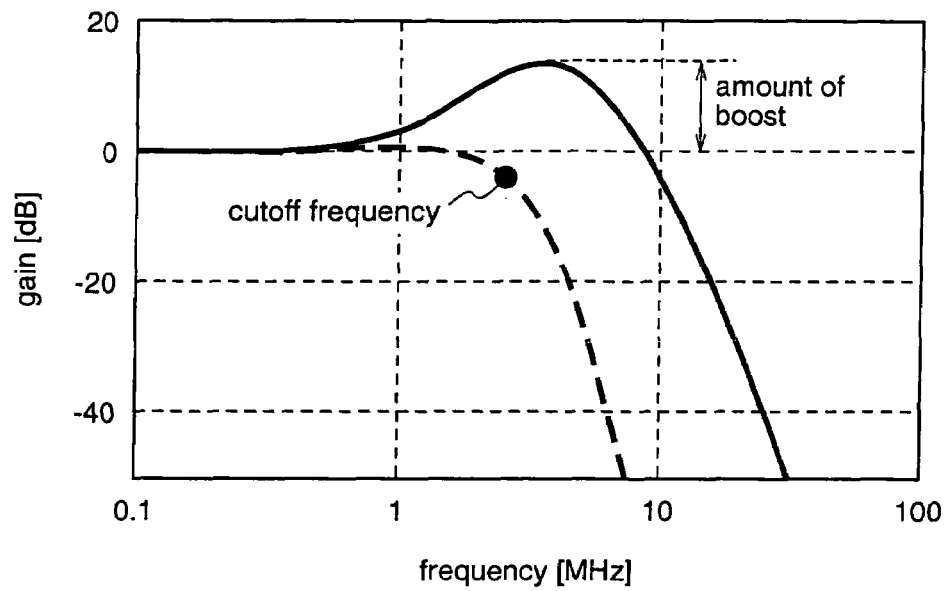
FIG. 2 is a diagram for explaining frequency characteristics of a high-order ripple filter.

With reference to FIG. 1, a playback RF signal 3 which is reproduced from an optical disc medium 1 by a playback signal detection circuit 2 is subjected to correction that emphasizes an output signal and simultaneously emphasizes a high-frequency band, by a playback RF signal adjustment circuit 4, and noise components existing in frequency band other than a demodulation signal are removed, thereby improving jitters. The playback RF signal adjustment circuit 4 comprises a filter that can arbitrarily set a boost quantity and a cut-off frequency. This filter may be a high-order ripple filter or the like having frequency characteristics as shown by a solid line in FIG. 2. In FIG. 2, a dotted line shows characteristics obtained when high-frequency boosting is not carried out.

Figure 3:
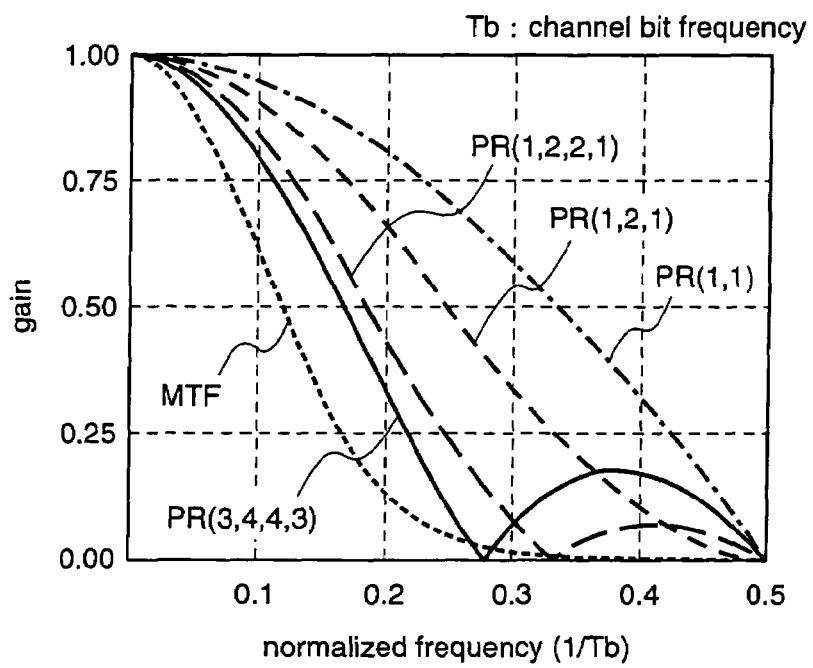
FIG. 3 is a diagram illustrating frequency characteristics and MTF characteristics of various kinds of partial response methods.

The output signal of the playback RF signal adjustment circuit 4 is sampled to a multiple-bit digital RF signal 6 by an AD converter 5 as a circuit for converting an analog signal into a digital signal, using a sampling clock 8 generated by a clock generation circuit 7. At this time, when codes of a digital binary signal 37 to be demodulated are recording codes having a restriction such that at least three identical codes should be continued, like 8-16 modulation codes used for a DVD (i.e., codes in which the minimum run-length is restricted by 2) and MTF (Mutual Transfer Function) characteristics as optical playback characteristics are distributed within a frequency band that is equal to or shorter than about ¼ (0.25 as a normalized frequency) of the channel bit frequency as shown in FIG. 3, it is theoretically possible to demodulate the digital binary signal 37 if it is sampled by the AD converter 5 using the sampling clock 8 having a frequency component that is half of the channel bit frequency, according to the sampling theorem.

The sampled multiple-bit digital RF signal 6 is input to the first offset correction circuit 9, thereby to correct offset components in the amplitude direction, which are included in the digital RF signal 6.

Hereinafter, a description will be given of the specific circuit construction and operation principle of the first offset correction circuit 9, with reference to FIGS. 4(a) and 4(b). The circuit shown in FIG. 4(a) is merely an example, and present invention is not restricted thereto.

Figure 4A:
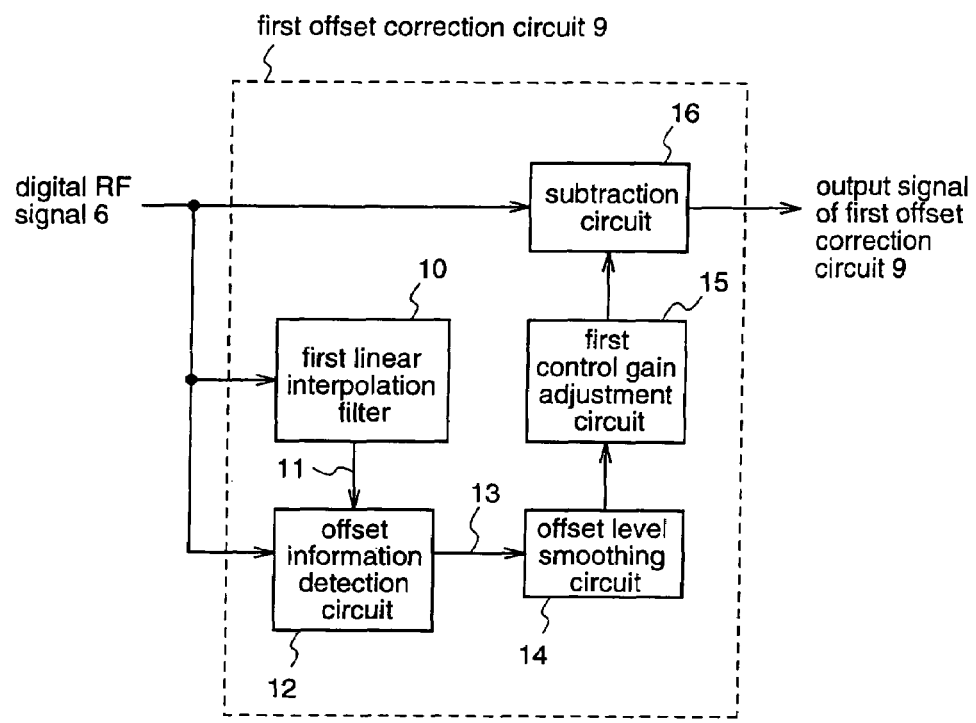
FIG. 4(a) is a block diagram illustrating the construction of a first offset correction circuit 9 according to the first embodiment.

FIG. 4(a) is a block diagram illustrating the construction of the first offset correction circuit 9. FIG. 4(b) is a diagram for explaining the operation principle of the first offset correction circuit 9.

Figure 4B:
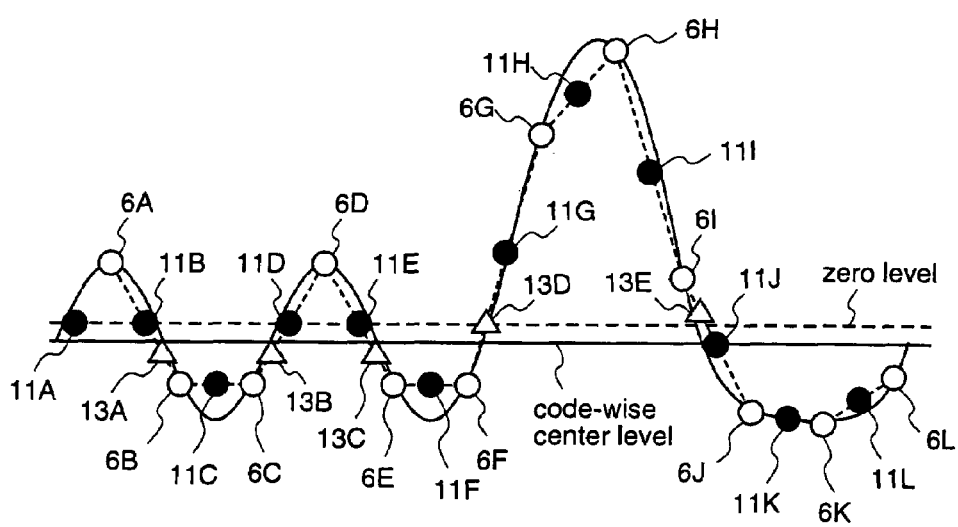
FIG. 4(b) is a diagram for explaining the operation principle of the first offset correction circuit 9 according to the first embodiment.

In FIGS. 4(a) and 4(b), interpolation signals 11 (11A~11L shown by black circles "●") which are components missing in the time direction in terms of the channel bit rate are restored from digital RF signals 6A~6L shown by white circles "○" which are sampled by the sampling clock 8 generated with reference to a frequency that is half of the channel bit frequency, using a first linear interpolation filter 10 having a function of performing averaging between adjacent data. Next, using the digital RF signals 6 and the interpolation signals 11, a zerocross position in which a digital RF signal 6 and an interpolation signal 11 have different polarities of codes with respect to the zero level as shown in FIG. 4(b) is detected by the offset information detection circuit 12, and offset information 13 (13A~13E shown by white triangles "△") in the zerocross position is detected. At this time, the operation principle of the offset information detection circuit 12 is as follows. That is, when the polarity of code of the digital RF signal 6F is different from the polarity of code of the interpolation signal 11G, it is determined that this position is a zerocross position (the same can be said of 11B and 6B, 6C and 11D, 11E and 6E, and others). In the position determined as a zerocross position, the digital RF signal 6F and the interpolation signal 11G are added and averaged, thereby generating offset information 13D. The offset information 13 is smoothed by an offset level smoothing circuit 14, and subjected to gain adjustment suited to the response characteristics of the purpose of the offset correction by a first control gain adjustment circuit 15, and thereafter, the offset information is subtracted from the digital RF signal 6 by a subtraction circuit 16, thereby reducing the offset components in the amplitude direction, which are included in the digital RF signal 6.

When the signal that is offset-corrected by the first offset correction circuit 9 has a large top-to-down asymmetric distortion as shown in FIG. 4(b), the offset information 13 cannot be accurately calculated by the calculation accuracy of the linear interpolation mentioned above, and thereby the code-wise center level may be out of the zero level. However, since the output signal of the first offset correction circuit 9 is to be used by a phase sync control circuit 17 described later, the control loop delay as short as possible is more advantageous in performance in phase sync control. Therefore, it is selected that a difference between the zero level and the code-wise center level will be compensated by a second offset correction circuit 27 described later, and the first control gain adjustment circuit 15 is set at a gain capable of high-speed response, whereby the first offset correction circuit 9 is intended for high-speed correction of offset fluctuation in the amplitude direction which occurs dependently of defects, such as stains or flaws on the recorded data surface of the optical disc medium 1, or off-track which occurs during tracking servo.

On the other hand, when applying the digital signal processing method, in order to reduce power consumption, it is necessary to generate, from the playback RF signal 3, a digital RF signal 6 which is synchronized with the phase of the frequency that is half of the frequency of the clock component included in the playback RF signal 3. In order to realize this, using the phase sync control circuit 17, phase error information 20 is detected on the basis of an output signal that is generated through the AD converter 5 and the first offset correction circuit 9 as well as a signal that is obtained by restoring a signal which is missing in the time direction from the output signal by interpolation, and thereafter, the detected phase error information 20 is converted into a phase sync control signal to be used for performing phase sync control, and then inputted to the clock generation circuit 7, thereby performing control so that the phase of the sampling clock 8 is synchronized with the phase of the frequency that is half of the frequency of the clock component included in the output signal of the playback RF signal adjustment circuit 4. The clock generation circuit 7 generates a sampling clock 8 according to the inputted voltage value, and the clock generation circuit 7 may be constructed by a voltage-controlled oscillator (hereinafter referred to as a VCO). Thus, phase sync control is realized by performing a sequence of circuit operations in order of the AD converter 5→the first offset correction circuit 9→the phase sync control circuit 17→the clock generation circuit 7→the AD converter 5.

Hereinafter, the specific circuit construction and operation principle of the phase sync control circuit 17 will be described in detail with reference to FIGS. 5(*a*) and 5(*b*). The circuit shown in FIG. 5(*a*) is merely an example, and the present invention is not restricted to the circuit.

Figure 5A:
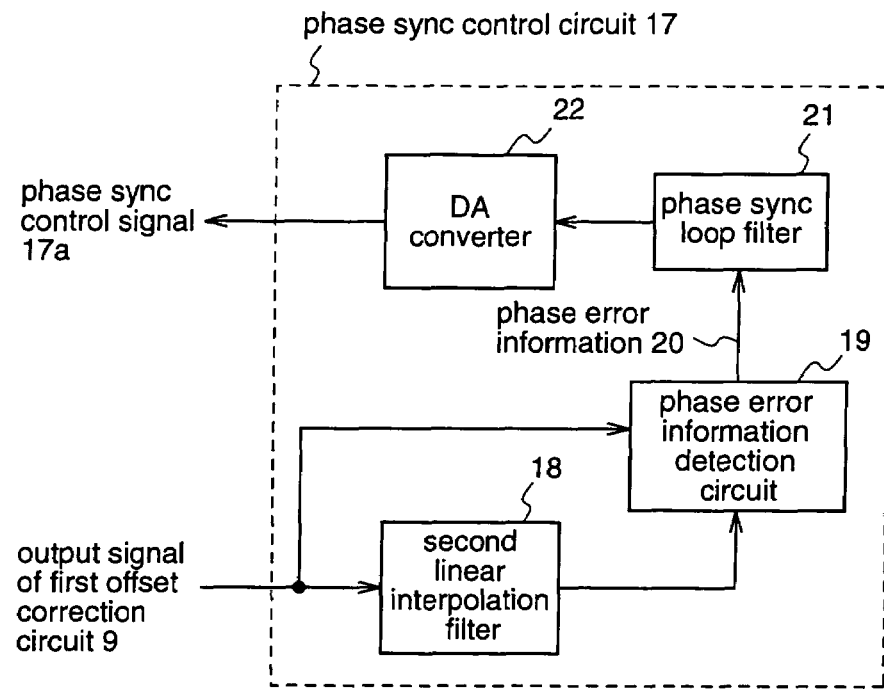
FIG. 5(a) is a block diagram illustrating the construction of a phase sync control circuit 17 according to the first embodiment.
Figure 5B:
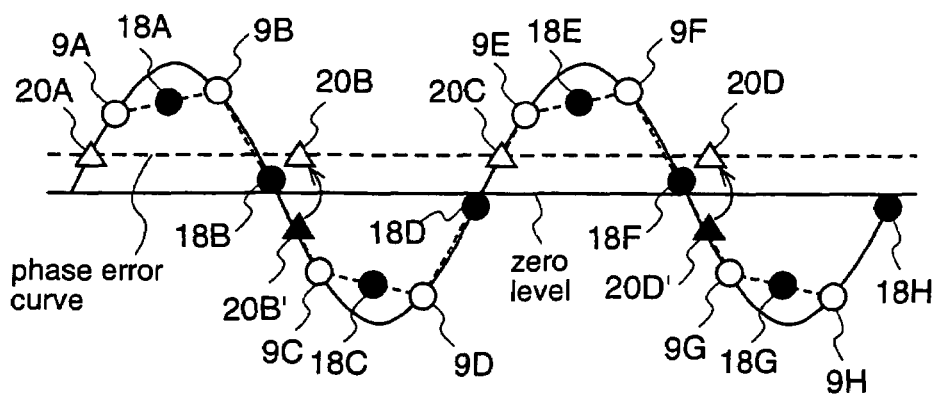
FIG. 5(b) is a diagram for explaining the detection principle of phase error information 20 according to the first embodiment.

FIG. 5(*a*) is a block diagram illustrating the construction of the phase sync control circuit 17. FIG. 5(*b*) is a diagram for explaining the principle of generating the phase error information 20 by the phase sync control circuit 17.

With reference to FIGS. 5(*a*) and 5(*b*), interpolation signals (18A~18H) shown by black circles, which are missing components in the time direction in terms of the channel bit rate, are restored from the output signals of the offset correction circuit 9 which are shown by white circles "◯", by using the second linear interpolation filter 18 having a function of performing averaging between adjacent data. For example, the adjacent output signals from the offset correction circuit 9 are added and averaged, thereby generating output signals (18A~18H) of the second linear interpolation filter 18.

Next, using the output signal of the first offset correction circuit 9 and the output signal of the second linear interpolation filter 18, a zerocross position in which the both signals have different polarities of codes with respect to the zero level as shown in FIG. 5(*b*) is detected by the phase error information detection circuit 19, and phase error information 20 (20A~20D shown by white triangles "△") in the zerocross position is detected. At this time, the operation principle of the phase error information detection circuit 19 is as follows. That is, the phase error information detection circuit 19 generates phase error information 20C (the same as for 20A and others) by adding and averaging the output signal of the first offset correction circuit 9 and the output signal of the linear interpolation filter 18, with respect to a rising edge in the position which is determined as a zerocross position. On the other hand, with respect to a falling edge, the output signal of the first offset correction circuit 9 and the output signal of the linear interpolation filter 18 are added and averaged to generate a phase error information preprocessing signal (falling edge) 20B' shown by black triangle "▲", and thereafter, the polarity thereof is inverted to generate phase error information 20B (the same as for 20D and others). A phase error curve obtained by connecting the phase error information 20A~20D thus obtained indicates the positive polarity with respect to the zero level, and thereby indicates that the phase is delayed. When the polarity is inverted, it means that the phase is advanced.

A phase sync loop filter 21 filters the phase error information 20 detected as described above. A digital-to-analog (hereinafter referred to as "DA") converter 22 converts the output signal of the phase sync loop filter 21 into a phase sync control signal which is an analog control signal. The phase sync loop filter 21 may be constituted so as to adjust the gains of the proportional component and the integral component, and mix the respective components to perform integration.

Figure 6:
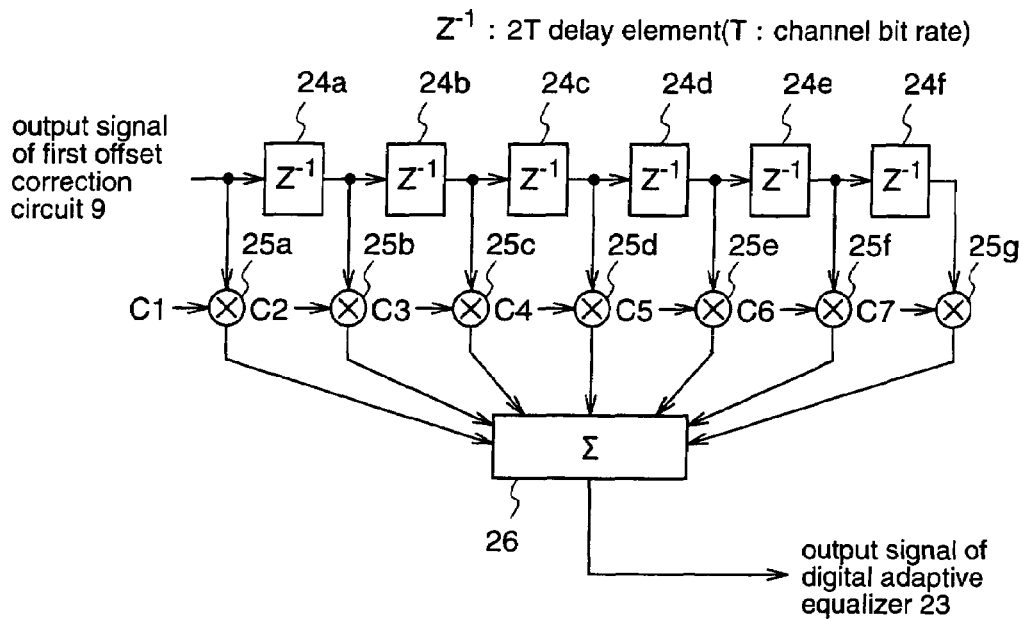
FIG. 6 is a block diagram illustrating the construction of a finite impulse response filter.

Next, a digital adaptive equalizer 23, to which the output signal of the first offset correction circuit 9 is inputted, performs equalization that improves the jitters of the input signal. At this time, the digital adaptive equalizer 23 may be constituted by, for example, a finite impulse response filter as shown in FIG. 6 comprising delay elements 24a to 24f for delaying a signal by 2T (T: channel bit frequency), which are constituted by D flip-flops; multipliers 25a to 25g for multiplying filter coefficients C1 to C7 with respect to the input signal (the output signal of the first offset correction circuit 9) and the outputs of the respective delay elements 24a to 24f; and an adder 26 for adding the output signals of the multipliers 25a to 25g. The circuit construction shown in FIG. 6 is merely an example, and the present invention is not restricted thereto.

The output signal of the digital adaptive equalizer 23 is input to the second offset correction circuit 27, wherein the offset components in the amplitude direction, which cannot be corrected by the first offset correction circuit 9, are corrected. Then, the output signal of the second offset correction circuit 27 is input to the interpolation filter 28, and the interpolation filter 28 restores the Nyquist band with a higher degree of accuracy than in the linear interpolation, thereby generating a second demodulation preprocessing signal 30 which is a missing component in the time direction in the channel bit rate. Simultaneously, the interpolation filter 28 delays the output signal of the first offset correction circuit 9 by a time equivalent to the operation delay time for obtaining the second demodulation preprocessing signal 30 in the interpolation filter 28, thereby generating a first demodulation preprocessing signal 29. Then, the second offset correction circuit 27 receives the first demodulation preprocessing signal 29 and the second demodulation preprocessing signal 30, and extracts offset components in the amplitude direction in the output signal of the digital adaptive equalizer 23 to correct the offset components. Since the above-mentioned defects and offset fluctuations in the amplitude direction are reduced by the first offset correction circuit 9 in the input signal of the second offset correction circuit 27, it is desired that the response speed of the second offset correction circuit 27 should be sufficiently low as compared with the response speed of the first offset correction circuit 9.

Figure 7:
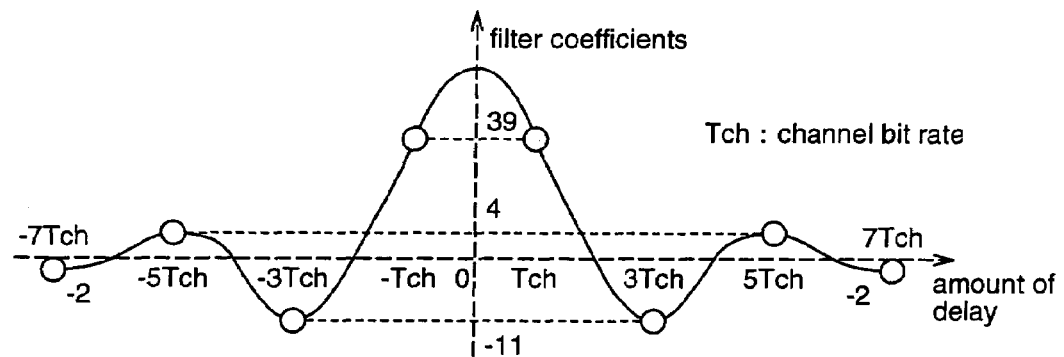
FIG. 7 is a diagram for explaining the operation principle of an interpolation filter 28 for restoring a Nyquist band.

The above-mentioned interpolation filter 28 may be constituted by a finite impulse response filter having filter coefficients for restoring the Nyquist band, as shown in FIG. 7. In FIG. 7, Tch indicates the channel bit rate, and the ordinate shows the filter coefficients of the finite impulse response filter. The longer the finite length of the filter is, the higher the accuracy of Nyquist interpolation becomes. For example, it is also possible to reduce the circuit scale by alleviating influence of an abandoning operation error of a finite tap, using window coefficients. The filter construction and the filter coefficients shown in FIG. 7 are merely examples, and the present invention is not restricted to the circuit.

Hereinafter, the specific circuit construction of the second offset correction circuit 27 and the operation principle including the interpolation filter 28 will be described with reference to FIGS. 8(a) and 8(b). The circuit shown in FIG. 8(a) is merely an example, and the present invention is not restricted to the circuit.

Figure 8A:
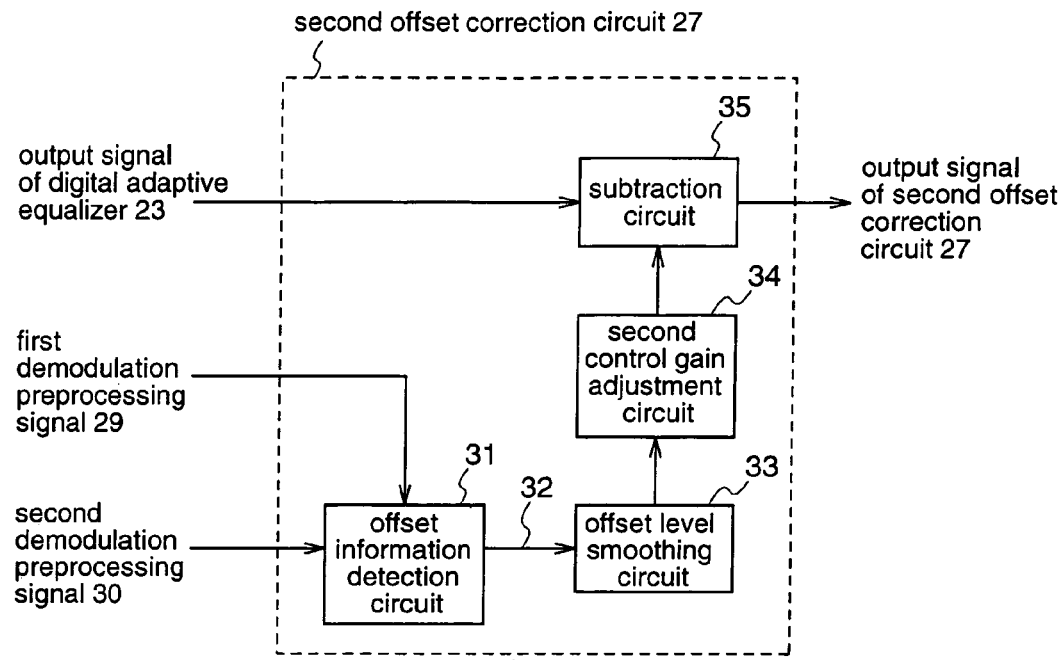
FIG. 8(a) is a block diagram illustrating the construction of a second offset correction circuit 27 according to the first embodiment.

FIG. 8(a) is a block diagram illustrating the construction of the second offset correction circuit 27. FIG. 8(b) is a diagram for explaining the operation principles of the second offset correction circuit 27 and the interpolation filter 28.

Figure 8B:
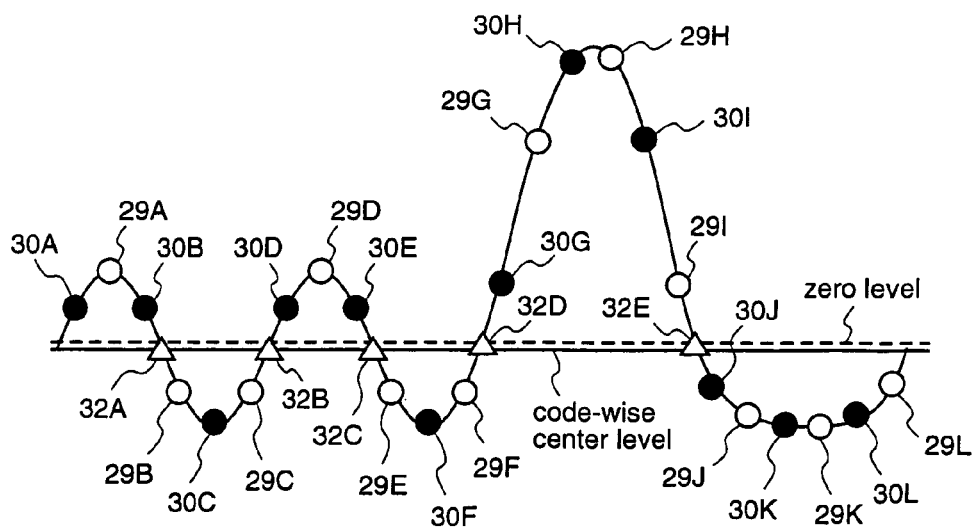
FIG. 8(b) is a diagram for explaining the operation principle of the second offset correction circuit 27 according to the first embodiment.

In FIGS. 8(a) and 8(b), second demodulation preprocessing signals 30 (30A~30L shown by black circles "●") which are missing components in the time direction in terms of the channel bit rate are restored from first demodulation preprocessing signals 29A~29L shown by white circles "○", by using the interpolation filter 28 that can restore the Nyquist band. Next, using the first demodulation preprocessing signal 29 and the second demodulation preprocessing signal 30, the offset information detection circuit 31 detects a zerocross position in which the both preprocessing signals 29 and 30 have different polarities of codes with respect to a zero level as shown in FIG. 8(b), and detects offset information 32 (32A~32E shown by white triangles "△") in the zerocross position. That is, as for the operation principle of the offset information detection circuit 31, since the polarity of code of the first demodulation preprocessing signal 29F is different from the polarity of code of the second demodulation preprocessing signal 30G, this position can be determined as a zerocross position (the same as for 30B and 29B, 29C and 30D, 30E and 29E, and others). In the position determined as a zerocross position, the first demodulation preprocessing signal 29F and the second demodulation preprocessing signal 30G are added and averaged, thereby generating offset information 32D (the same can be said of 32A, 32B, 32C, and others). The offset information 32 is smoothed by an offset level smoothing circuit 33, and the output of the offset level smoothing circuit 33 is subjected to gain adjustment suited to the response characteristics of the purpose of the offset correction by a second control gain adjustment circuit 34, and thereafter, the offset information is subtracted from the output signal of the digital adaptive equalizer 23 by a subtraction circuit 35, thereby reducing the offset components in the amplitude direction, which are included in the output signal of the digital adaptive equalizer 23.

As for the signal thus offset-corrected by the second offset correction circuit 27 and the interpolation filter 28, since the offset information can be accurately calculated by the calculation accuracy of the above-mentioned Nyquist interpolation even for a signal having a large top-to-down asymmetric distortion as shown in FIG. 8(b), the code-wise center level approximately matches the zero level. Since the defects and the temporal change in the offset fluctuation in the amplitude direction have been compensated by the first offset correction circuit 9, the second control gain adjustment circuit 34 is set at a gain capable of low-speed response, whereby the second offset correction circuit 27 is applied for low-speed and high-precision correction in order to secure demodulation performance of a digital binary signal 37 described later and jitter detection accuracy even when, for example, the asymmetric distortion is large.

The first demodulation preprocessing signal 29 and the second demodulation preprocessing signal 30 generated by the interpolation filter 28 are input to the data demodulation circuit 36 to be determined whether each signal has a positive polarity or a negative polarity with respect to the zero level.

For example, the signal is fixed to "1" when it has a positive polarity, while the signal is fixed to "0" when it has a negative polarity, thereby demodulating the digital binary signal 37. To be specific, the first demodulation preprocessing signals 29A, 29D, 29G, 29H, and 29I shown by white circles "○" in FIG. 8 (b) and the second demodulation preprocessing signals 30A, 30B, 30D, 30E, 30G, 30H, and 30I shown by black circles "●" are demodulated to "1". On the other hand, the first demodulation preprocessing signals 29B, 29C, 29E, 29F, 29J, 29K, and 29L shown by white circles "○" and the second demodulation preprocessing signals 30C, 30F, 30J, 30K, and 30L shown by black circles "●" are demodulated to "0". These signals may be determined as "1" or "0" based on not the zero level but an arbitrary threshold level. The above-mentioned demodulation method is merely an example, and the present invention is not restricted thereto.

Further, the first demodulation preprocessing signals 29 and the second demodulation preprocessing signals 30 generated by the interpolation filter 28 are input to the jitter detection circuit 38, wherein jitter information 39 is detected.

Hereinafter, the operation principle of the jitter detection circuit 38 will be described with reference to FIG. 9. The principle shown in FIG. 9 is merely an example, and the present invention is not restricted thereto.

Figure 9:
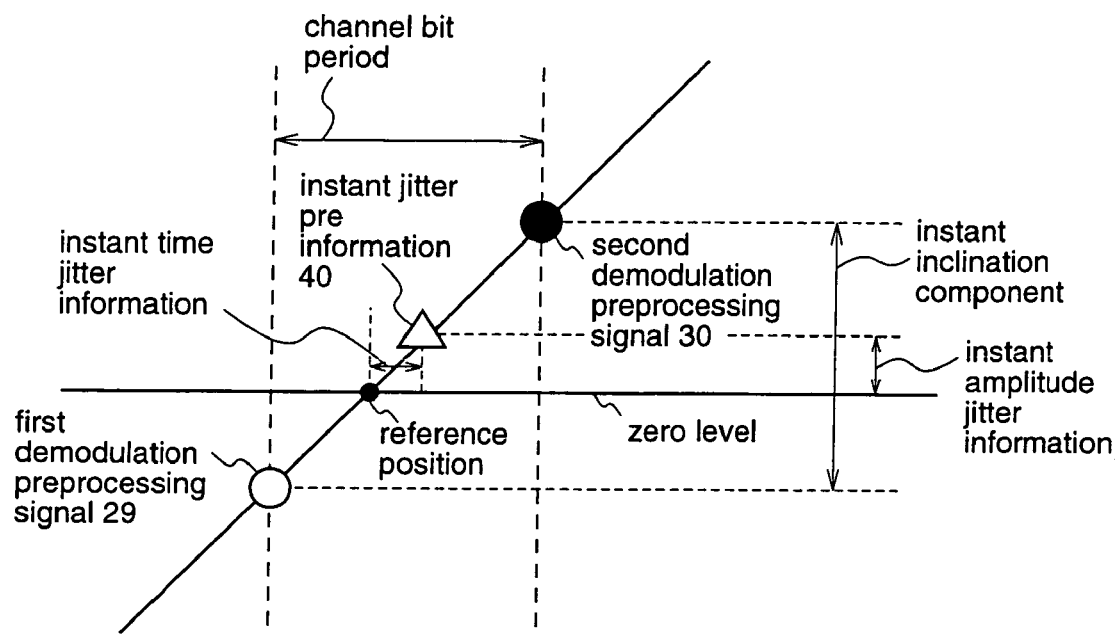
FIG. 9 is a diagram for explaining the detection principle of jitter information 39 according to the first embodiment.

FIG. 9 is a diagram for explaining the operation principle of the jitter detection circuit 38.

With reference to FIG. 9, using a first demodulation preprocessing signal 29 shown by a white circle "○" and a second demodulation preprocessing signal 30 shown by a black circle "●" as input signals, a zerocross position is determined by the same principle as that of the second offset correction circuit 27, and thereafter, the first demodulation preprocessing signal 29 and the second demodulation preprocessing signal 30 are added and averaged in the zerocross position, thereby generating instant jitter pre information 40 shown by a white triangle "△". Simultaneously, an absolute value of a difference between the first demodulation preprocessing signal 29 and the second demodulation preprocessing signal 30 is calculated, thereby calculating an instant inclination component shown in FIG. 9. The instant inclination component corresponds to a channel bit period when it is projected in the time direction in the case where the vicinity of the center level of the signal to be subjected to jitter detection has linearity. In the case where an absolute value of a distance from the zero level of the instant jitter pre information 40 in the amplitude direction is instant amplitude jitter information, when this signal is projected in the time direction, it corresponds to instant time jitter information. Thereby, a relationship shown by formula (1) as follows is derived. In formula (1), "||" expresses an absolute value.

$$\frac{|\text{instant time jitter information}|}{|\text{channel bit period}|} = \frac{|\text{instant amplitude jitter information}|}{|\text{instant inclination component}|}$$

Accordingly, the instant jitter information at the zerocross position can be calculated from a relationship shown by formula (2) as follows.

$$\text{instant jitter information} = \frac{|\text{instant jitter pre information}|}{|(1st\ DEM\ \text{preprocessing signal 29}) - (2nd\ DEM\ \text{preprocessing signal 30})|}$$

The extracted instant jitter information for every zerocross is smoothed to extract jitter information 39.

Since the jitter information 39 serves as an indicator which indicates the quality of the playback RF signal 3 or the quality of the digital RF signal 6, it is possible to accurately recognize the quality of the data recorded on the optical disc medium 1, and further, it is possible to perform more accurate adjustment when carrying out focus servo balance learning to minimize the value of the jitter information 30 or adjustment of the boost quantity and the cutoff frequency of the high-order equal ripple filter in the playback RF signal adjustment circuit 4, resulting in improved playback performance.

As described above, the optical disc playback apparatus according to the first embodiment is provided with the first offset correction circuit for performing phase sync control corresponding to high-speed control in view of linear interpolation, and the second offset correction circuit for performing highly accurate offset correction in view of Nyquist interpolation. Therefore, the first offset correction and the phase sync control can be carried out in association with each other, against defects or rapid offset fluctuations, and further, the second offset correction can accurately reduce the offset components in the amplitude direction in the signal used for level determination, whereby sufficient playback performance can be realized even when an asymmetry, which exists in the playback RF signal depending on the recording quality of the recorded digital data, is large.

Further, since detection of jitter which serves as an indicator for playback signal quality can be carried out with high accuracy, it is possible to accurately perform adjustment of the cutoff frequency and boost learning of an analog equalizer to improve the jitter of the playback RF signal, and adjustment of the best point for balance learning in focus servo relating to the performance of the playback RF signal, resulting in an optical disc playback apparatus which can improve the quality of the playback signal even during high-speed playback, and can realize low power consumption.

Embodiment 2

Figure 10:
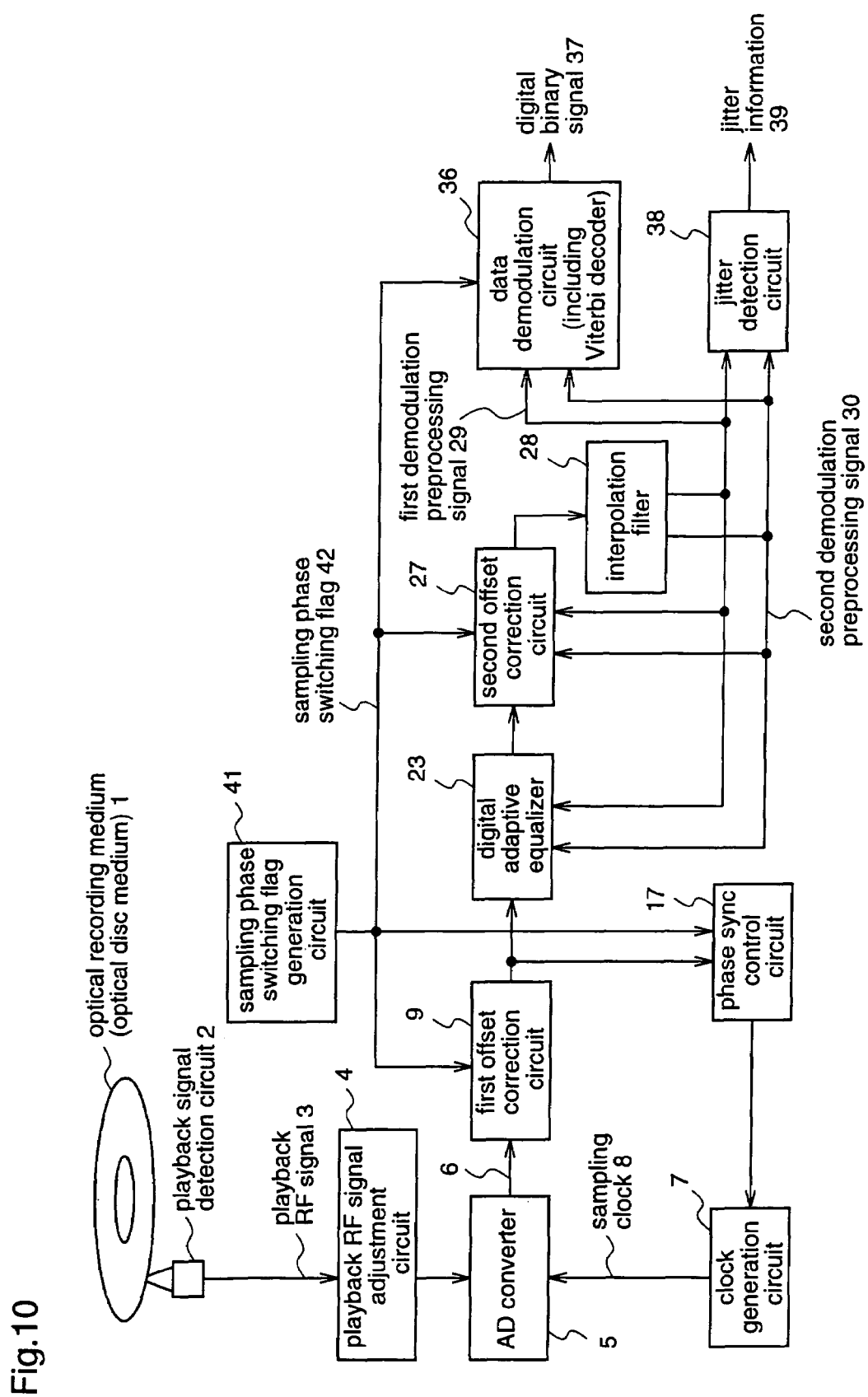
FIG. 10 is a block diagram illustrating the construction of an optical disc playback apparatus according to a second embodiment of the present invention.

FIG. 10 is a block diagram illustrating the construction of an optical disc playback apparatus according to a second embodiment of the present invention.

The second embodiment corresponds to claims 6 and 7 of the present invention. This second embodiment is different from the first embodiment in that the second embodiment is provided with a circuit for generating a sampling phase switching flag for selecting either phase sync control using the same phase as used in the first embodiment or phase sync control using a phase that is 180 degrees different from the phase of the first embodiment, when performing phase sync control in terms of a channel bit clock; and a means for changing the modes of the first offset correction circuit, the phase sync control circuit, the digital adaptive equalizer, the second offset correction circuit, and the data demodulation circuit to the sampling mode according to the PRML signal processing method, on the basis of the sampling phase switching flag that is generated from the sampling phase switching flag generation circuit. Further, the second embodiment is different from the first embodiment in that the digital adaptive equalizer is provided with a filter coefficient learning circuit for performing adaptive automatic learning control when receiving, as an input signal, the output signal of the interpolation filter, which has been processed by the second offset correction circuit. Since these functions are added, it is possible to improve the playback performance when applying not only the level determination method but also the PRML signal processing method, and further, even when there exists a large asymmetry.

With reference to FIG. 10, when the sampling phase switching flag 42 generated from the sampling phase switching flag generation circuit 41 is "0", fundamentally the same operation as described for the first embodiment is carried out. This operation is merely an example, and the present invention is not restricted thereto.

Next, a description will be given of the circuit constructions and operation principles of the first offset correction circuit 9, the phase sync control signal 17, the digital adaptive equalizer 23, the second offset correction circuit 27, and the data demodulation circuit 36 in the case where the sampling phase switching flag 42 is "1".

Hereinafter, the specific circuit construction and operation principle of the first offset correction circuit 9 according to the second embodiment will be described with reference to FIGS. 11(*a*) and 11(*b*). The circuit shown in FIG. 11(*a*) is merely an example, and the present invention is not restricted thereto.

Figure 11A:
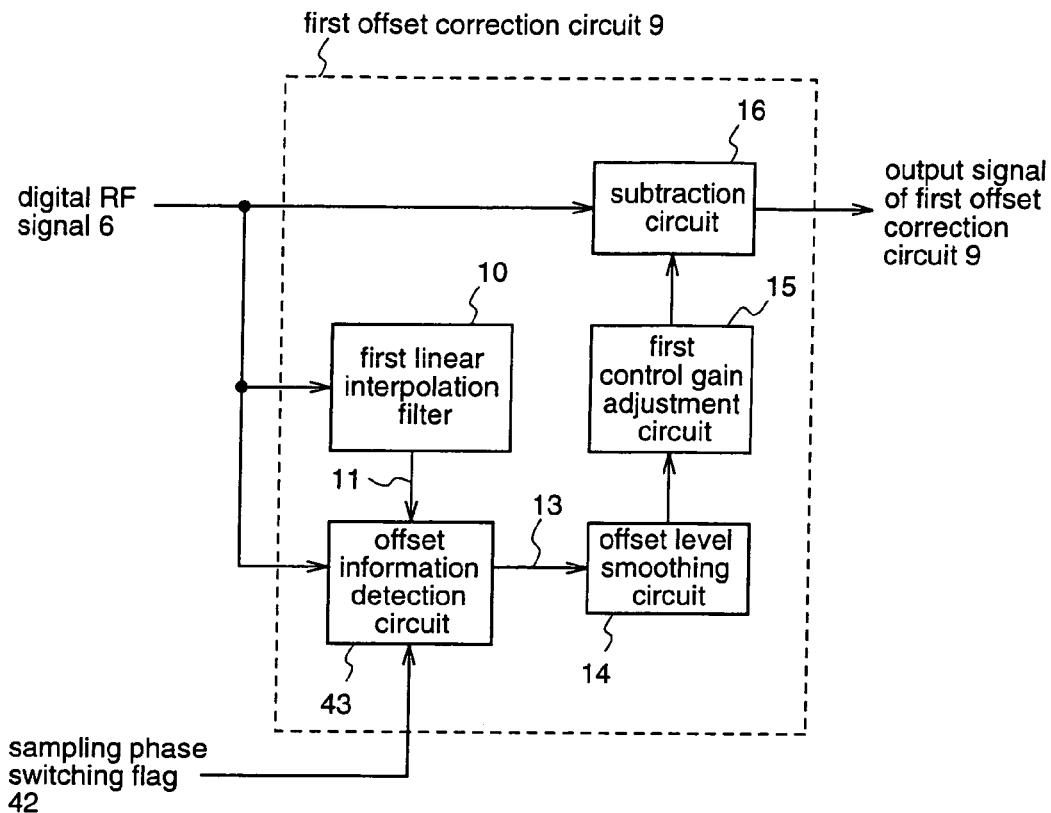
FIG. 11(a) is a block diagram illustrating the construction of a first offset correction circuit according to the second embodiment.

FIG. 11(*a*) is a block diagram illustrating the construction of the first offset correction circuit 9 according to the second embodiment. FIG. 11(*b*) is a diagram for explaining the operation principle of the first offset correction circuit 9 according to the second embodiment.

With reference to FIGS. 11(*a*) and 11(*b*), the second embodiment is different from the first embodiment in that the sampling phase switching flag 42 is input to the offset information detection circuit 43, and the offset information detection circuit 43 operates with the same principle as that of the first embodiment when the sampling phase switching flag 42 is "0", while phase sync control is carried out in a position where the phase is 180 degrees shifted with respect to the channel bit clock, so as to make the PRML signal processing method applicable when the sampling phase switching flag 42 is "1". Therefore, the principle of detecting the offset information 13 according to the second embodiment is different from that of the first embodiment. Since other functions and operations are identical to those described for the first embodiment, in this second embodiment only the operation principle of the offset information detection circuit 43 will be described specifically, and descriptions of other functions will be omitted.

With reference to FIG. 11(*b*), when the sampling phase switching flag 42 is "1", for example, the digital RF signals 6F and 6G are added and averaged to generate an interpolation signal 11G. Next, the digital RF signal 6 (e.g., 6B) and the interpolation signal 11 (e.g., 11C) which are adjacent to each other are added and averaged by the offset information detection circuit 43 to generate zerocross position detection data 44 shown by white triangles "Δ" (e.g., 44B, the same as for 44A~44J). Then, a zerocross position in which the polarities of codes of the zerocross position detection data 44 are different from each other with respect to the zero level is detected as shown in FIG. 11(*b*), and offset information 13 in the zerocross position (in this case, 6B, 11D, 6E, 11G, 11J correspond thereto) is detected.

Hereinafter, a description will be given of the specific circuit construction and operation principle of the phase sync control circuit 17 according to the second embodiment, with reference to FIGS. 12(*a*) and 12(*b*). The circuit shown in FIG. 12(*a*) is merely an example, and the present invention is not restricted thereto.

Figure 12A:
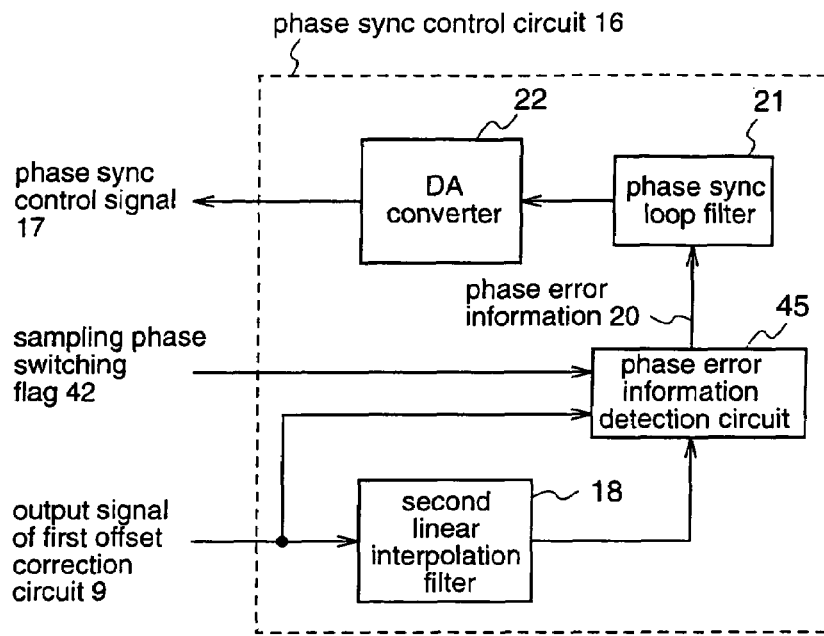
FIG. 12(a) is a block diagram illustrating the construction of a phase sync control circuit 17 according to the second embodiment.
Figure 12B:
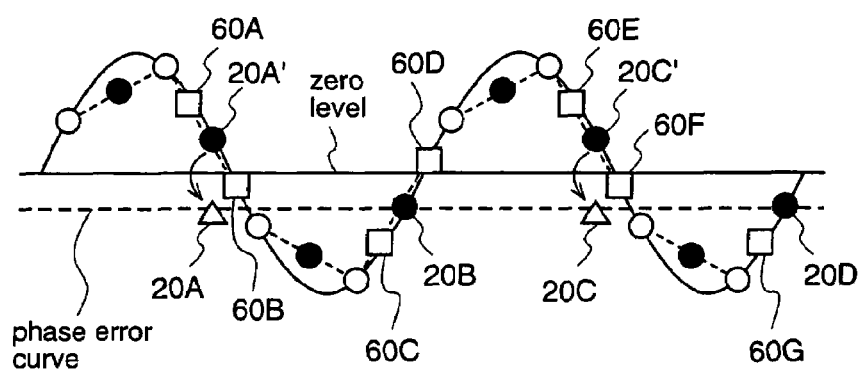
FIG. 12(b) is a diagram for explaining the detection principle of phase error information 20 according to the second embodiment.

FIG. 12(*a*) is a block diagram illustrating the construction of the phase sync control circuit 17 according to the second embodiment. FIG. 12(b) is a diagram for explaining the generation principle of the phase error information 20 by the phase sync control circuit 17.

With reference to FIGS. 12(a) and 12(b), the second embodiment is different from the first embodiment in that the sampling phase switching flag 42 is input to the phase error information detection circuit 45, and the phase error information detection circuit 45 operates with the same principle as that of the first embodiment when the sampling phase switching flag 42 is "0", while phase sync control is carried out in a position where the phase is 180 degrees shifted with respect to the channel bit clock, so as to make the PRML signal processing method applicable when the sampling phase switching flag 42 is "1". Therefore, the principle of detecting the phase error information 20 according to the second embodiment is different from that of the first embodiment. Since other functions and operations are identical to those described for the first embodiment, in this second embodiment only the operation principle of the phase error information detection circuit 45 will be described specifically, and descriptions of other functions will be omitted.

Figure 11B:
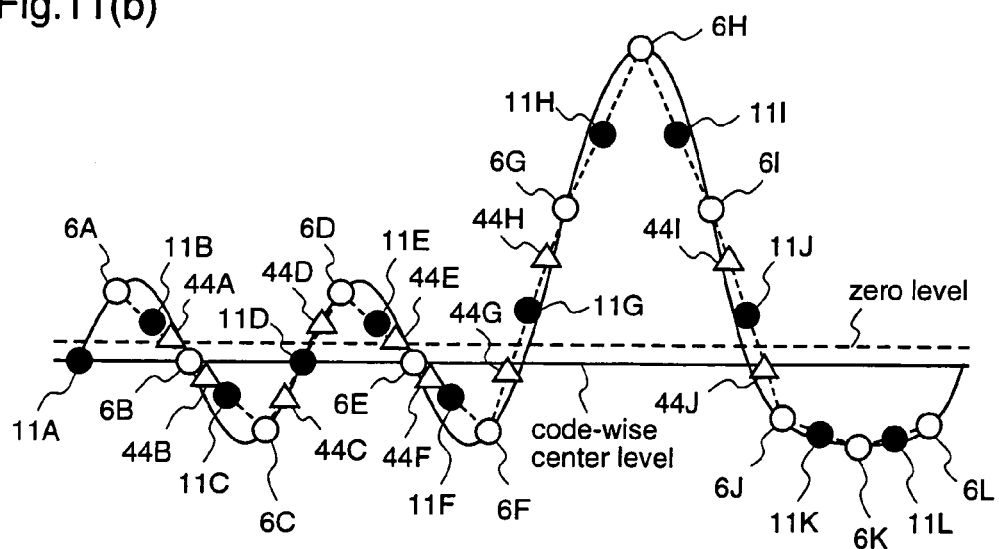
FIG. 11(b) is a diagram for explaining the operation principle of the first offset correction circuit according to the second embodiment.

With reference to FIG. 12(b), when the sampling phase switching flag 42 is "1", for example, the output signal of the first offset correction circuit 9 and the output signal of the second linear interpolation filter 18, which are adjacent to each other, are added and averaged to generate zerocross position detection signals 60A~60G shown by white squares "□" (corresponding to 44A~44J in FIG. 11(b)). Subsequently, the phase error information detection circuit 45 detects, using the zerocross position detection signals 60A~60G, a zerocross position in which the zerocross position detection signals have different polarities of codes with respect to the zero level, and detects phase error information 20 (in this case, 20A~20D) in the zerocross position. At this time, as for a falling edge, the output signal 9C of the first offset correction circuit 9 and the output signal 18B of the second linear interpolation filter 18 are added and averaged to generate phase error information preprocessing signals 20A' and 20C'. Thereafter, as shown by white triangles "Δ" 20A and 20C, the polarities of the output signals 20A' and 20C' from the second linear interpolation filter 18 are inverted to obtain phase error information 20A and 20C.

In this second embodiment, a phase error curve obtained by connecting the phase error information 20A~20D shows the negative polarity with respect to the zero level, thereby indicating that the phase is advanced.

Hereinafter, a description will be given of the specific circuit structure and operation principle of the digital adaptive equalizer 23 according to the second embodiment, with reference to FIGS. 6 and 13. The circuit shown in the figures is merely an example, and the present invention is not restricted thereto.

Figure 13:
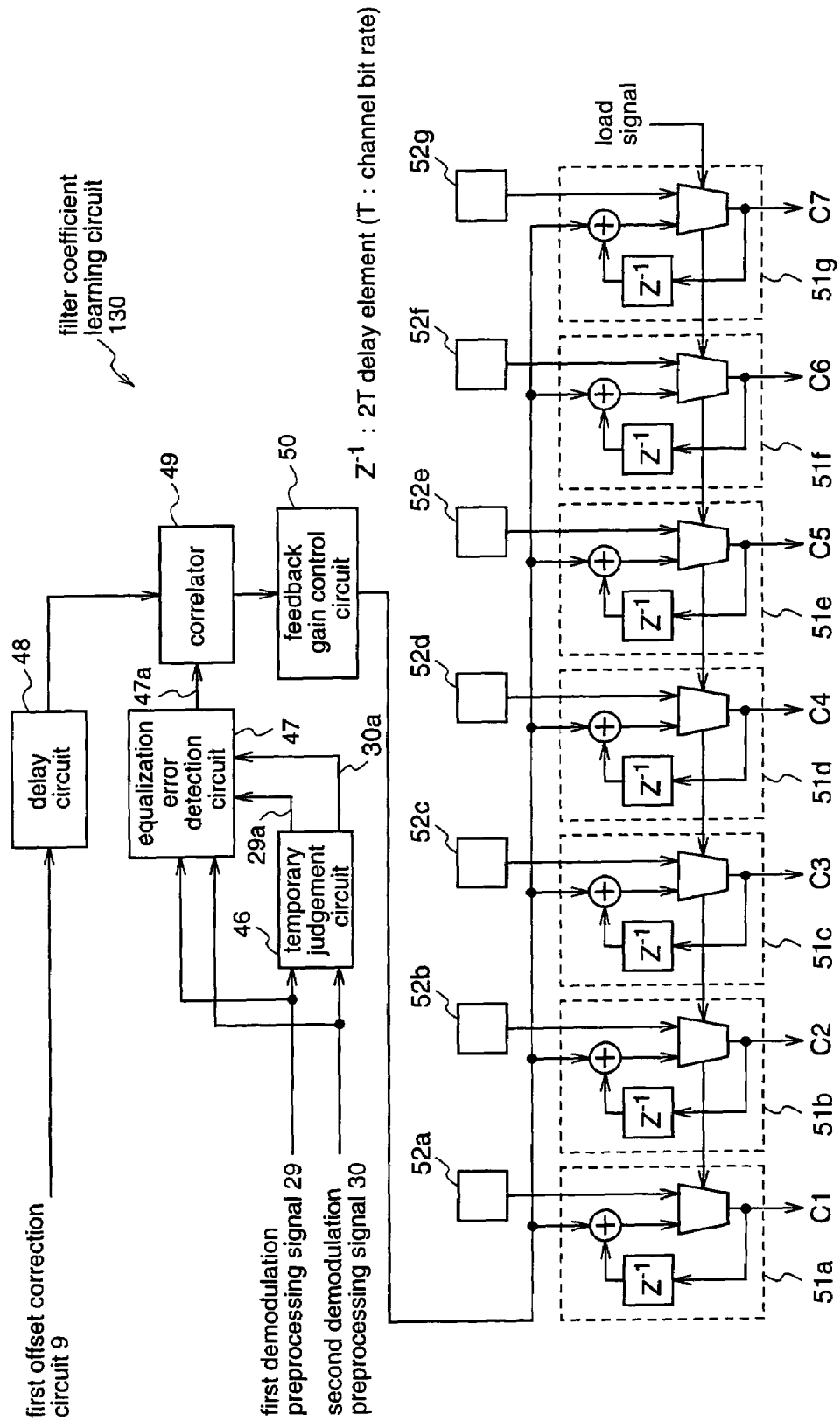
FIG. 13 is a block diagram illustrating the construction of a filter coefficient learning circuit as a component of a digital adaptive equalizer 23 according to the second embodiment.

FIG. 13 is a block diagram of a filter coefficient learning circuit which is a component of the digital adaptive equalizer 23 according to the second embodiment. The filter coefficient learning circuit 130 is a circuit for performing adaptive automatic learning of filter coefficients of finite impulse response filters C1~C7 shown in FIG. 6 to perform partial response equalization in accordance with an applied partial response method, using least mean square (hereinafter referred to as LMS).

Figure 14A:
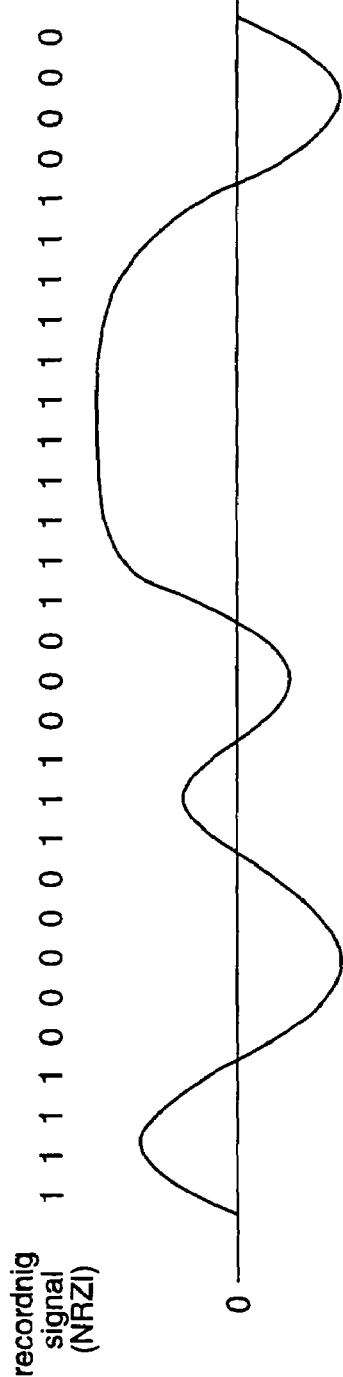
FIG. 14 is a diagram for explaining recording codes, a level determination method, and a PR (a,b,b,a) equalization method.
Figure 14B:
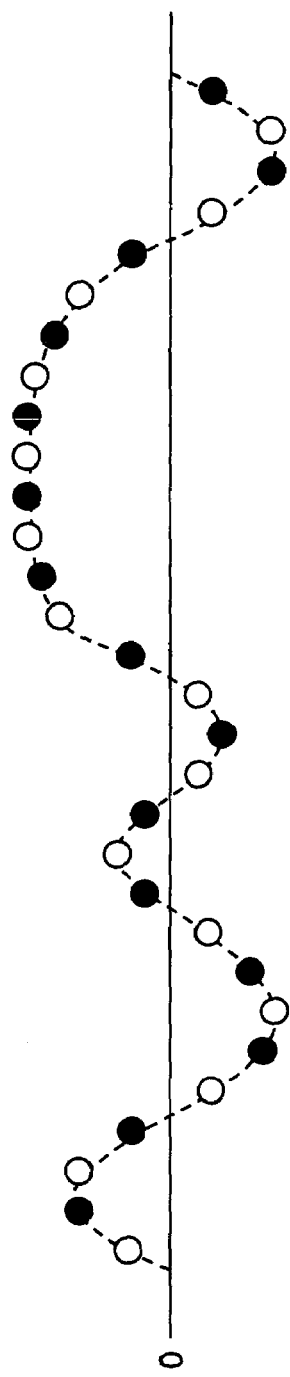
Figure 14C:
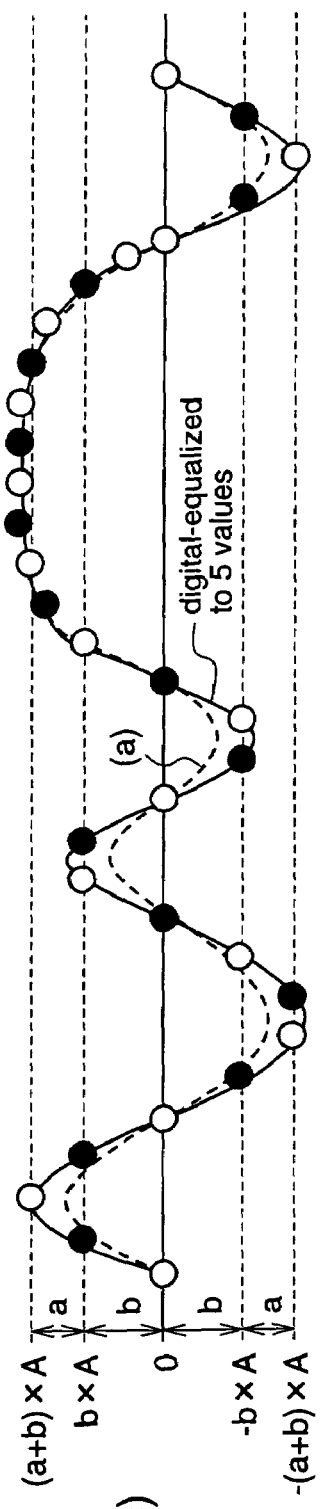

As the partial response equalization, for example, a PR (a,b,b,a) method in which the waveform amplitude after equalization is separated into five values as shown in FIG. 14(c) is used for a DVD. In FIG. 14, white circles "○" show partial-response-equalized sampling signals which are synchronized with the phase of a frequency that is equal to half of the clock component of the playback RF signal 3, and black circles "●" show signals obtained by restoring the missing signals in the time direction in terms of the channel bit rate. FIG. 14(a) shows the output signal of the playback RF signal adjustment circuit 4, FIG. 14(b) shows first demodulation preprocessing signals 29 (white circles "○") and second demodulation preprocessing signals 30 (black circles "●") which are sampling signals to be used for binary determination (level determination) in the case of the first embodiment or in the case where the sampling phase switching flag 42 is "0", and FIG. 14(c) shows a PR (a,b,b,a) equalization output signal, that is, an output signal of the digital adaptive equalizer 23, in the case where the sampling phase switching flag 42 is "1" in the second embodiment and demodulation is carried out using the PRML signal processing method.

The PR (a,b,b,a) method is characterized by that sampling data at different four times are added at a ratio of a:b:b:a $(a+b*D+b*D^2+a*D^3)$, and a characteristic of a low-pass filter as shown in FIG. 3 is added to the playback signal. In FIG. 3, PR (1,2,2,1) and PR (3,4,4,3) correspond the PR (a,b,b,a) method. It is considered that an advantageous partial response method has frequency characteristics closer to the MTF characteristics shown in FIG. 3. There are various kinds of partial response methods other than the PR (a,b,b,a) method shown in FIG. 3. The present invention is not restricted to a specific method, and any method may be employed so long as the method is appropriate for the performance. A PRML signal processing that is advantageous to high-density recording and playback in the linear recording direction is realized by combining the partial response method for adding correlativity to the playback data in the time direction, with a Viterbi decoder for estimating a most probable sequence by utilizing the added correlativity of data, which is a maximum likelihood decoding method described later. As described above, there exist various combinations depending on the characteristics of playback waveforms and the demodulation codes, as PRML signal processing methods, and therefore, it is necessary to select an appropriate method for each recording/playback system.

When the sampling phase switching flag 42 is "0", since the operation is carried out based on the same principle as described for the first embodiment, the filter coefficient learning circuit is not necessarily used. However, when the sampling phase switching flag 42 is "1", the PRML signal processing method can be applied. Therefore, for example, the filter coefficients C1~C7 of the finite impulse response filter shown in FIG. 6 are set by the filter coefficient learning circuit which utilizes the LMS algorithm for performing adaptive control so as to minimize the equalization error existing in the output signal of the digital adaptive equalizer 23 which is outputted from the adder 26.

As shown in FIG. 13, the filter coefficient learning circuit 130 comprises a temporary determination circuit 46 for detecting, from the first demodulation preprocessing signal 29 and the second demodulation preprocessing signal 30, equalization target values of these signals corresponding to the partial response method; an equalization error detection circuit 47 for subtracting the equalization target values 29a and 30a from the first demodulation preprocessing signal 29 and the second demodulation preprocessing signal 30, respectively, to detect an equalization error signal 47a; a delay circuit 48 for delaying the output signal of the first offset correction circuit 9 so as to adjust correlation between the first demodulation preprocessing signal 29 and the second demodulation preprocessing signal 30, in order to calculate correlation between the output signal of the equalization error detection circuit 47 and the output signal of the first offset correction circuit 9 which is the input signal to the finite impulse response filter; a correlator 49 for multiplying the output signal of the equalization error detection circuit 47 and the output signal of the delay circuit 48; a feedback gain control circuit 50 for determining a control gain of automatic adaptive feedback control by adding a gain to the signal outputted from the correlator 49; and filter coefficient updation units 51a to 51g for adding the output of the feedback gain control circuit 50 to the filter coefficients of the respective taps to update the filter coefficients. When adaptive control is started, the initial values of the filter coefficients stored in initial value storage means 52a to 52g are loaded by a load signal, and thereafter, adaptive automatic equalization control of the filter coefficients is carried out. The equalized output signals outputted from the digital adaptive equalizer 23 in the disc playback apparatus according to the second embodiment shown in FIG. 10 are shown by white circles "○" in FIG. 14(c). On the other hand, the interpolated signals obtained by the interpolation filter 28 are shown by black circles "●" in FIG. 14(c).

Since adaptive automatic equalization is carried out by the above-mentioned sequence of operations, even when there is a large asymmetry and an offset in the amplitude direction is not sufficiently reduced by the first offset correction circuit 9, it becomes possible to perform temporary determination using the first demodulation preprocessing signal 29 and the second demodulation preprocessing signal 30 and calculate an equalization error from the target partial response type, by the highly-precise offset correction effect of the second offset correction circuit 27, whereby incorrect feedback or the like is reduced to enhance the adaptive automatic equalization performance, resulting in significant improvement in the playback performance in association with maximum likelihood decoding described later.

Next, a description will be given of the specific circuit structure and operation principle of the second offset correction circuit 27 according to the second embodiment, with reference to FIGS. 15(a) and 15(b). The circuit shown in FIG. 15(a) is merely an example, and the present invention is not restricted thereto.

Figure 15A:
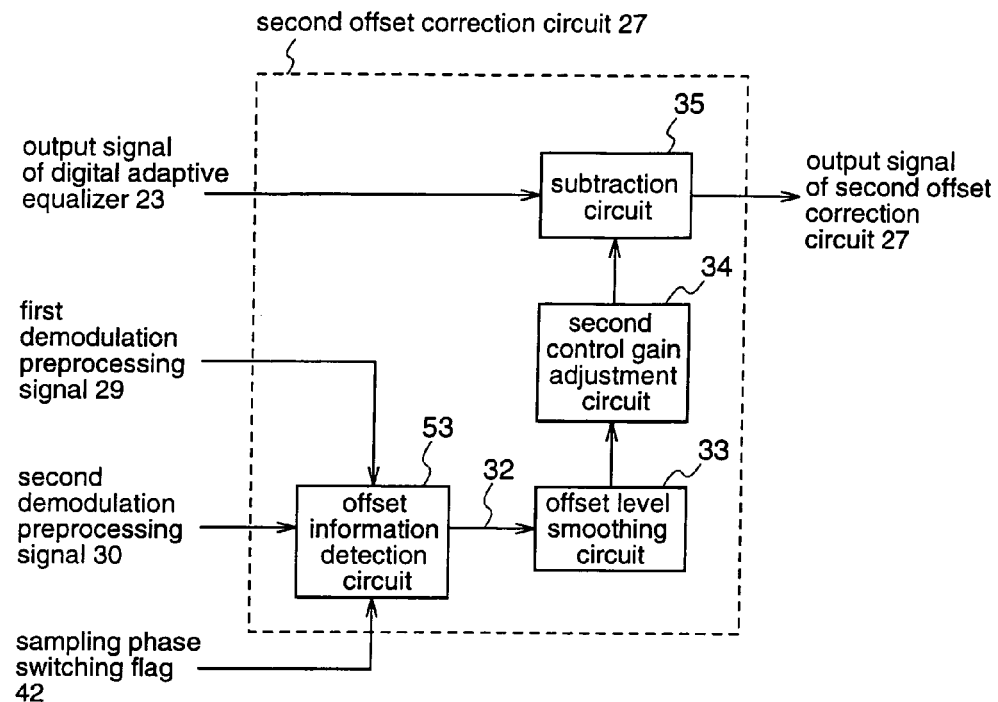
FIG. 15(a) is a block diagram illustrating the construction of a second offset correction circuit 27 according to the second embodiment.

FIG. 15(a) is a block diagram illustrating the construction of the second offset correction circuit according to the second embodiment. FIG. 15(b) is a diagram for explaining the operation principle of the second offset correction circuit 27 according to the second embodiment.

Figure 15B:
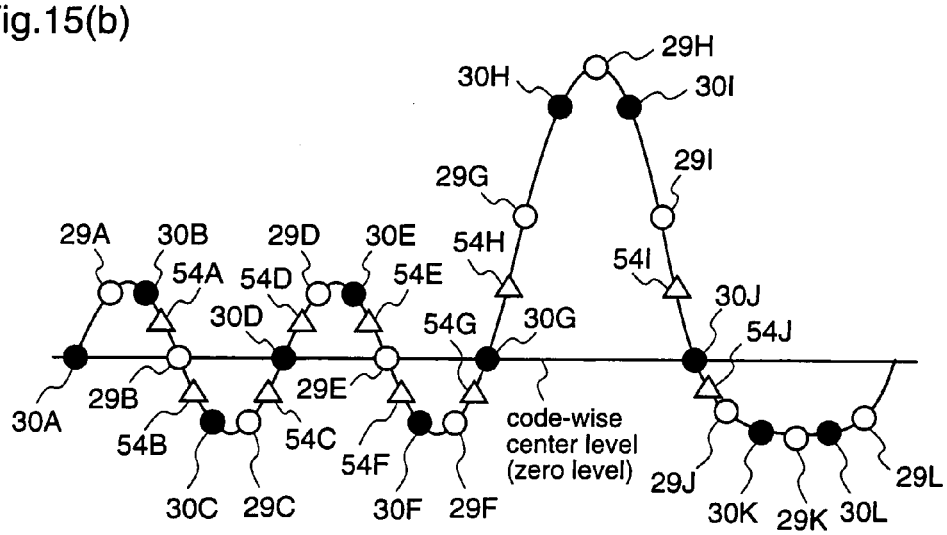
FIG. 15(b) is a diagram for explaining the operation principle of the second offset correction circuit 27 according to the second embodiment.

With reference to FIGS. 15(a) and 15(b), the second offset correction circuit 27 according to this second embodiment is different from that of the first embodiment in that the sampling phase switching flag 42 is input to the offset information detection circuit 53, and the offset information detection circuit 53 operates with the same principle as that of the first embodiment when the sampling phase switching flag 42 is "0", while phase sync control is carried out in a position where the phase is 180 degrees shifted with respect to the channel bit clock, in order to make the PRML signal processing method applicable when the sampling phase switching flag 42 is "1". Therefore, the principle of detecting the offset information 32 according to the second embodiment is different from that of the first embodiment. Since other functions and operations are identical to those described for the first embodiment, in this second embodiment only the operation principle of the offset information detection circuit 53 will be described specifically, and descriptions of other functions will be omitted.

With reference to FIG. 15(b), when the sampling phase switching flag 42 is "1", for example, a second demodulation preprocessing signal 30G is generated and then the first demodulation preprocessing signal 29 (e.g., 29B) and the second demodulation preprocessing signal 30 (e.g., 30C) which are adjacent to each other are added and averaged by the offset information detection circuit 53, thereby to generate zerocross position detection data 54 shown by white triangles "△" (e.g., 54B, the same as to 54A to 54J). Then, a zerocross position in which the polarities of codes of the zerocross position detection data 44 (e.g., 54A and 54B, 54C and 54D, . . . ) differ from each other with respect to the zero level is detected as shown in FIG. 15(b), and offset information 32 in the zerocross position (in this case, 29B, 30D, 29E, 30G, and 30J) is detected.

Through the above-described sequence of operations, even in the case where there is a large asymmetry when the sampling phase switching flag 42 is "1", the code-wise center levels of the first demodulation preprocessing signal 29 as the output signal of the second offset correction circuit 27 and the second demodulation preprocessing signal 30 converted by the interpolation filter 28 which can restore the Nyquist band of the signal approximately match the zero level, whereby the offset component in the amplitude direction can be significantly reduced. This effect, or a combination of this effect with maximum likelihood decoding described later, enhances the playback performance against the asymmetry.

Next, the first demodulation preprocessing signal 29 and the second demodulation preprocessing signal 30 which are generated by the interpolation filter 28 are input to the data demodulation circuit 36 to generate a digital binary signal 37. This second embodiment is different from the first embodiment in that the sampling phase switching flag 42 is input to the data demodulation circuit 36, and the operation is carried out based on the level level determination method by the same principle as described for the first embodiment when the sampling phase switching flag 42 is "0", while the PRML signal processing method is applicable when the sampling phase switching flag 42 is "1".

For example, when the sampling phase switching flag 42 is "1", the data demodulation circuit 36 may demodulate the digital binary signal 37 by maximum likelihood (hereinafter referred to as ML) decoding. Alternatively, the data demodulation circuit 36 may demodulate the digital binary signal 37 by using a Viterbi decoder which is a representative implementation of ML decoding.

Figure 16A:
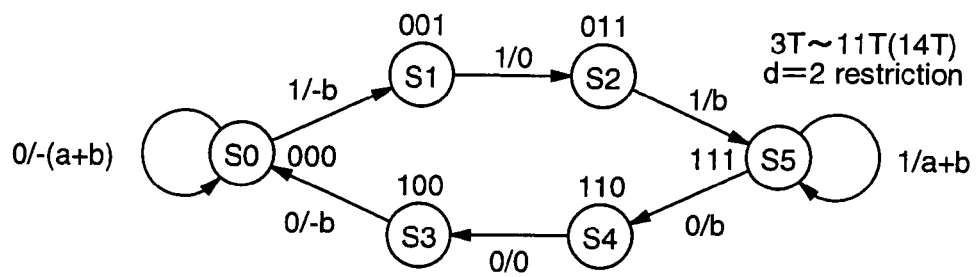
FIG. 16(a) is a diagram illustrating state transition of a parallel type Viterbi decoder which is a component of a data demodulation circuit 36 according to the second embodiment.
Figure 16B:
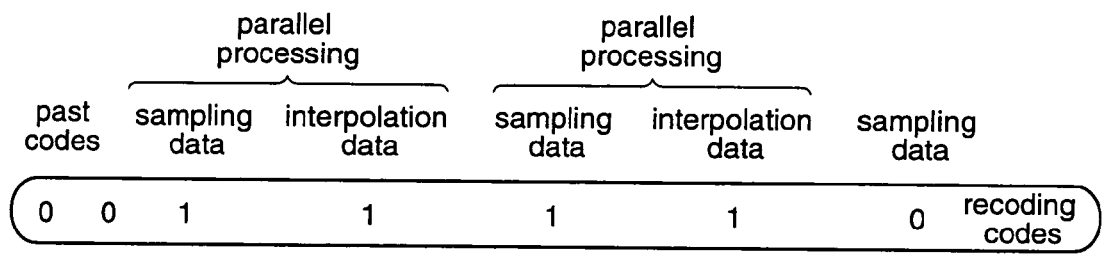
FIG. 16(b) is a diagram illustrating a decoding procedure of the parallel type Viterbi decoder which is a component of the data demodulation circuit 36 according to the second embodiment.
Figure 16B:
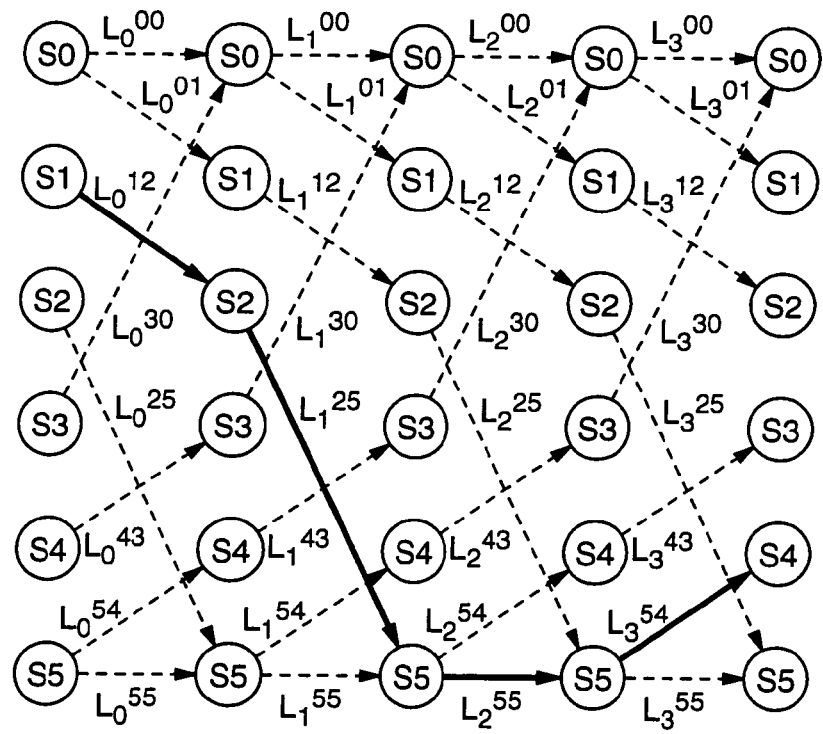
Figure 17:
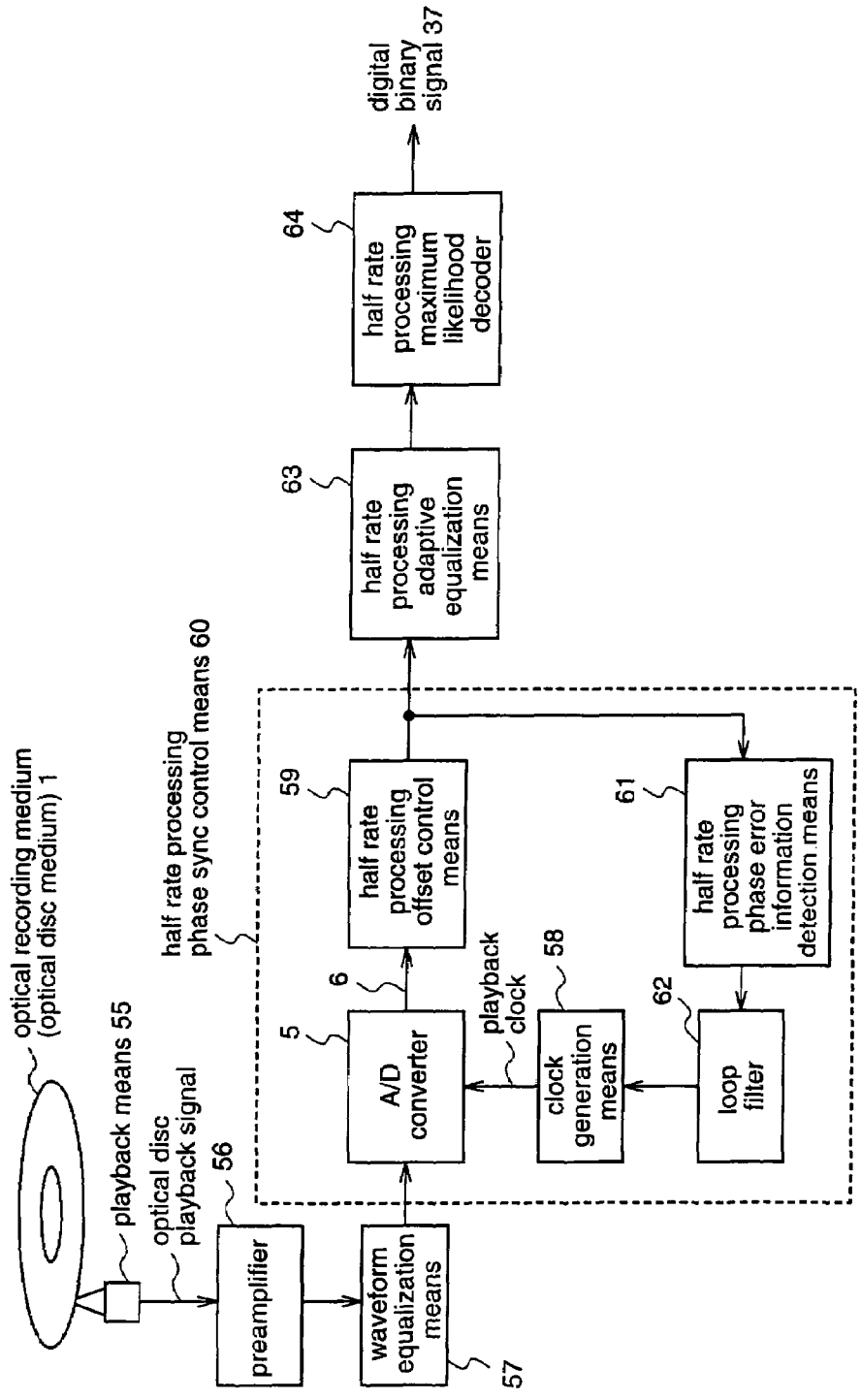
FIG. 17 is a block diagram illustrating the construction of a conventional optical disc playback apparatus.

Hereinafter, the operation principle of the Viterbi decoder will be described with reference to FIGS. 16(a) and 16(b). The operation principle to be described is merely an example, and the present invention is not restricted thereto.

The Viterbi decoder performs probability calculation according to a principle of correlation of codes which are intentionally added according to the type of partial response to estimate a most probable sequence. For example, when the applied partial response type is PR (a,b,b,a), the state changes on the basis of a state transition diagram as shown in FIG. 16(a). The state transition diagram is based on 8-16 demodulation codes used for a DVD, and the minimum run length is limited to 2, and therefore, it can be expressed by state transition of six states from from S0 to S5. In FIG. 16(a), X/Y indicates transition of a recording code (X), and a signal amplitude at that time (Y). Further, one state is expressed by adjacent three codes of time. For example, the state transition from S4 "110" to S3 "110" means that a code "0" is added to "110"and thereby "110" is shifted leftwards, and "1" at the left end disappears, resulting in the state S3 "100". However, when the processing rate is a frequency that is half of the channel bit frequency, adjacent two states must be considered as one state in the state transition shown in FIG. 16(a). For example, when the interpolation filter 28 outputs the first demodulation preprocessing signal 29 and the second demodulation preprocessing signal 30 in parallel with each other, the normal data in the normal sampling position (the first demodulation preprocessing signal 29) and the interpolation data (the second demodulation preprocessing signal 30) are input to the adjacent two states, respectively, followed by parallel processing. The timewise change at this time is expressed by a trellis line map shown in FIG. 16(b) which is characterized by that the normal data and the interpolation data are processed in parallel with each other. Then, a probable length $l_k^{ab}$ (hereinafter referred to as a brunch metric) of each path is calculated, and the brunch metric is added when transition is made to each state. In the $l_k^{ab}$, k indicates a timewise transition, and ab indicates a brunch metric in transition from the state Sa to Sb. The sum of the brunch metrics in each state is called a metric, and a path with the minimum metric is successively outputted as a survival path, thereby demodulating to the digital binary signal 37. That is, assuming that demodulation is carried out according to the recording codes shown in FIG. 16(b), the path shown by a solid line is the survival path.

The detection accuracy of the jitter detection circuit 38 is increased when the sampling phase switching flag 42 is "0", i.e., when the phase sync state is that for applying the level determination method, in view of a calculation error in linear interpolation or the like. Therefore, it is desirable that the operation should be carried out with the sampling phase switching flag 42 being "0".

According to the second embodiment, the optical disc playback apparatus is provided with, when the PRML signal processing method is also applied, the first offset correction circuit for performing phase sync control corresponding to high-speed control based on linear interpolation, and the second offset correction circuit for performing highly precise offset correction based on Nyquist interpolation. Therefore, the first offset correction and the phase sync control can be carried out in response to each other against defects or rapid offset fluctuations, and further, an offset component in the signal amplitude direction can be reduced with high precision, including the case of using the PRML signal processing method, by the second offset correction. Thereby sufficient playback performance can be realized even when an asymmetry, which exists in the playback RF signal depending on the recording quality of the recorded digital data, is large.

To be specific, in the case where not only the level determination method but also the PRML signal processing method are used for demodulation of digital data, since the above-mentioned two types of offset correction circuits having different roles are employed, it is possible to solve the problem that the offset correction accuracy is degraded due to a calculation error caused by an asymmetry that occurs when digital demodulation is carried out using a frequency equal to half of the channel bit frequency, which leads to remaining offset components that degrade the digital binary signal demodulation performance, resulting in an optical disc playback apparatus having favorable playback performance.

Moreover, since detection of jitter to be an indicator of playback signal quality can be carried out with high accuracy, it is possible to accurately perform adjustment of the cutoff frequency and boost learning of an analog equalizer to improve the jitter of the playback RF signal, and adjustment of the best point for balance learning in focus servo relating to the performance of the playback RF signal, resulting in an optical disc playback apparatus which can improve the quality of the playback signal even during high-speed playback, and can realize low power consumption.

APPLICABILITY IN INDUSTRY

An optical disc playback apparatus according to the present invention realizes low power consumption, and maintains high-quality playback performance against deterioration, such as asymmetry, of quality of data recorded on an optical recording medium, and therefore, it is useful in a DVD player or a DVD recorder.

Furthermore, in view of the above-mentioned low power consumption, the optical disc playback apparatus is useful in a digital handycam movie equipped with a recording type optical disc, or an optical disc drive for a notebook-sized personal computer.

What is claimed is:

1. An optical disc playback apparatus for demodulating digital data from an optical recording medium on which digital data are recorded using recording codes having a restriction that at least three same codes should be continued, said apparatus comprising:

a playback signal detection circuit for detecting a playback RF signal from the optical recording medium;

a playback RF signal adjustment circuit for adjusting an amplitude of the playback RF signal, and improving jitters;

a clock generation circuit for generating a sampling clock that is synchronized with a period twice as long as a clock component included in the playback RF signal;

an AD converter for generating a digital RF signal by sampling an output signal of the playback RF signal adjustment circuit with the sampling clock;

a first offset correction circuit for correcting an offset component in an amplitude direction in the digital RF signal;

a phase sync control circuit for extracting phase error information from an output signal of the first offset correction circuit, and performing phase sync control of the sampling clock generated by the clock generation circuit, so as to bring the phase error information close to zero;

a digital adaptive equalizer for adaptively equalizing the output signal of the first offset correction circuit;

a second offset correction circuit for correcting an offset component in the amplitude direction which occurs in an output signal of the digital adaptive equalizer due to influence of the offset component that cannot be corrected by the first offset correction circuit;

an interpolation filter for receiving the output signal of the digital adaptive equalizer as an input signal, and generating a first demodulation preprocessing signal by delaying the input signal by a predetermined period of time, and a second demodulation preprocessing signal which is a signal missing in the time direction of the input signal;

said second offset correction circuit extracting offset information in the amplitude direction from the first demodulation preprocessing signal and the second demodulation preprocessing signal to correct the offset component in the amplitude direction of the output signal from the digital adaptive equalizer;

a jitter detection circuit for extracting jitter information from the first demodulation preprocessing signal and the second demodulation preprocessing signal; and a data demodulation circuit for demodulating the first demodulation preprocessing signal and the second demodulation preprocessing signal to obtain a digital binary signal.

2. An optical disc playback apparatus as defined in claim 1 wherein
    said first offset correction circuit is provided with a first linear interpolation filter for restoring a signal that is missing in the time direction due to conversion of the digital RF signal with a channel bit, by obtaining an average of two digital RF signals which are timewise adjacent to each other; and
    said first offset correction circuit extracts an offset component in the amplitude direction of the digital RF signal from the digital RF signal and an output signal of the first linear interpolation filter, and corrects the offset component in the amplitude direction of the digital RF signal.

3. An optical disc playback apparatus as defined in claim 1 wherein
    said phase sync control circuit is provided with a second linear interpolation filter for restoring a signal that is missing in the time direction due to conversion of the digital RF signal with a channel bit, by obtaining an average of two output signals from the first offset correction circuit, which are timewise adjacent to each other; and
    said phase sync control circuit extracts phase error information from an output signal of the first offset correction circuit and an output signal of the second linear interpolation filter, and performs phase sync control of the sampling clock generated by the clock generation circuit, so as to bring the phase error information close to zero.

4. An optical disc playback apparatus as defined in claim 1 wherein said interpolation filter comprises a finite impulse response filter having a minimum number of taps required for maintaining accuracy, and restores a Nyquist band.

5. An optical disc playback apparatus as defined in claim 1 wherein
    said first offset correction circuit is provided with a first control gain adjustment circuit for adjusting the control speed;
    said second offset correction circuit is provided with a second control gain adjustment circuit for adjusting the control speed;
    said first control gain adjustment circuit sets a control gain for high-speed control; and
    said second control gain adjustment circuit sets a control gain for low-speed control.

6. An optical disc playback apparatus as defined in claim 5 further including:
    a sampling phase switching flag generation circuit for generating a sampling phase switching flag which changes a sampling phase of the AD converter by selecting either 0° or 180° for a phase of a channel bit frequency; and
    said phase sync control circuit changing a method for detecting the phase error information, according to the sampling phase switching flag;
    said first offset correction circuit and said second offset correction circuit changing a method for extracting an offset component in the amplitude direction, according to the sampling phase switching flag;
    said digital adaptive equalizer performing adaptive equalization on the basis of a partial response method; and
    said data demodulation circuit further including a maximum likelihood decoding circuit that performs calculation of probability according to the partial response method, and changing a demodulation method according to the sampling phase switching flag.

7. An optical disc playback apparatus as defined in claim 6 wherein said digital adaptive equalizer comprises a finite impulse response filter, and is provided with a filter coefficient learning circuit for learning weighting factors of taps of the filter so that a root-mean-square error of the first demodulation preprocessing signal and the second demodulation preprocessing signal from a target level of the partial response system approaches zero.

* * * * *